(12) United States Patent
Yoon et al.

(10) Patent No.: US 11,795,685 B2
(45) Date of Patent: Oct. 24, 2023

(54) BEVERAGE MAKER AND METHOD FOR MANUFACTURING COVER OF BEVERAGE MAKER

(71) Applicant: LG ELECTRONICS INC., Seoul (KR)

(72) Inventors: Shic Yoon, Seoul (KR); Taehoon Kim, Seoul (KR); Bonken Gu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 588 days.

(21) Appl. No.: 16/872,535

(22) Filed: May 12, 2020

(65) Prior Publication Data

US 2020/0362554 A1     Nov. 19, 2020

(30) Foreign Application Priority Data

May 14, 2019   (KR) ......................... 10-2019-0056544

(51) Int. Cl.
*E04B 1/84*  (2006.01)
*C12C 11/00* (2006.01)
*C12C 13/10* (2006.01)

(52) U.S. Cl.
CPC .......... *E04B 1/8409* (2013.01); *C12C 11/006* (2013.01); *C12C 13/10* (2013.01)

(58) Field of Classification Search
None
See application file for complete search history.

(56) References Cited

U.S. PATENT DOCUMENTS

| 2008/0160153 A1* | 7/2008 | Hestekin | A47J 31/407 |
| | | | 99/323.3 |
| 2010/0167003 A1* | 7/2010 | Vahle | B32B 3/26 |
| | | | 428/101 |
| 2019/0031985 A1* | 1/2019 | Chong | B67D 1/0462 |

FOREIGN PATENT DOCUMENTS

| KR | 10-2009-0023522 | 3/2009 |
| KR | 10-2018-0129105 | 12/2018 |

OTHER PUBLICATIONS

Korean Office Action dated Dec. 21, 2020.

* cited by examiner

*Primary Examiner* — John J Norton
(74) *Attorney, Agent, or Firm* — KED & ASSOCIATES

(57) ABSTRACT

A beverage maker and a method for manufacturing a cover for a beverage maker are provided. The beverage maker may include a base, a tank case spaced upward from the base and in which a tank configured to contain a fluid for making a beverage may be accommodated, a machine room defined between the base and the tank case, a cover configured to cover the tank case and the machine room at one side, a sound absorption pad attached to an inner surface of the cover, the sound absorption pad being disposed within the machine room or facing the machine room, and at least one sound absorption member compressed between the inner surface of the cover and an outer surface of the tank case.

11 Claims, 16 Drawing Sheets

BEVERAGE MAKER AND METHOD FOR MANUFACTURING COVER OF BEVERAGE MAKER

CROSS-REFERENCE TO RELATED APPLICATION(S)

The present application claims priority under 35 U.S.C. 119 and 35 U.S.C. 365 to Korean Patent Application No. 10-2019-0056544 filed in Korea on May 14, 2019, which is hereby incorporated by reference in its entirety.

BACKGROUND

1. Field

A beverage maker and a method for manufacturing a cover of a beverage maker are disclosed herein.

2. Background

Beverages are collectively referred to as drinkable liquids, such as alcohol or tea. For example, beverages may be divided into various categories, such as water (a beverage) to solve thirst, juice beverages with unique flavor and taste, refreshing beverages giving a refreshing sensation, favorite beverages with an arousal effect, or alcoholic beverages with an alcohol effect.

Representative examples of such a beverage is beer. The beer is an alcoholic beverage made by making juice of malt sprouting from barley, filtering the juice, adding hop, and fermenting the juice using the yeast.

Consumers may purchase ready-made products made and sold by a beer maker or make beer at home (hereinafter "homemade" beer) by directly fermenting beer ingredients at home or in a bar. Homemade beer may be made in a variety of types and may be made to suit a consumer's taste.

The ingredients for making beer may include water, malt, hop, fermentation accelerators, and flavoring additives, for example. The fermentation accelerators, which are called yeast, may be added to malt to ferment the malt and help to produce alcohol and carbonic acid. The flavor additives are additives that enhance the taste of beer, such as fruit, syrup, and vanilla beans, for example.

Generally, homemade beer may include three stages or operations, namely, a wort stage or operation, a fermentation stage or operation, and an aging stage or operation, and it may take about two to three weeks from the wort stage or operation to the aging stage or operation. It is important for the homemade beer to maintain an optimum temperature during the fermentation operation, and the easier the beer is to make, the more user convenience is improved.

Recently, a beverage maker capable of easily making beer at home or in a bar has been gradually used. It is preferable that such a beverage maker be capable of safely and easily making beer.

BRIEF DESCRIPTION OF THE DRAWINGS

Embodiments will be described in detail with reference to the following drawings in which like reference numerals refer to like elements, and wherein.

DETAILED DESCRIPTION

Figure 1:
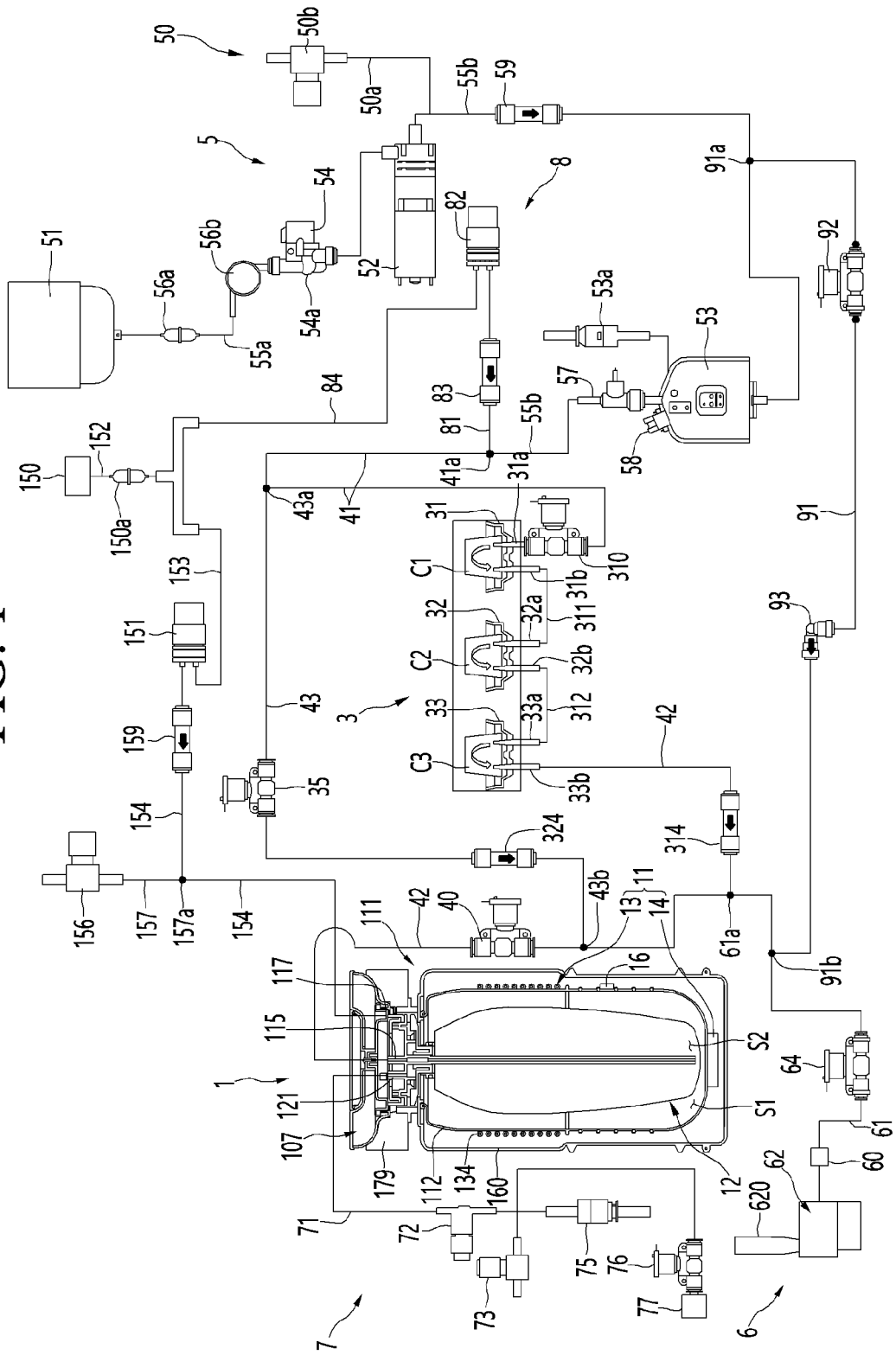
FIG. 1 is a schematic view of a beverage maker according to an embodiment.

Hereinafter, embodiments will be described with reference to the accompanying drawings. Wherever possible, the same or like reference numerals have been used to indicate the same or like elements and repetitive disclosure has been omitted.

Although beer is exemplified as a beverage made using a beverage maker according to embodiments, a kind of beverage capable of being made using the beverage maker is not limited to beer. For example, various kinds of beverages may be made using the beverage maker according to embodiments.

FIG. 1 is a schematic view of a beverage maker according to an embodiment. The beverage maker may include a fermentation module 1. A beverage may be fermented in the fermentation module 1. The beverage maker may include a temperature controller that controls an inner temperature of the fermentation module 1.

The beverage maker may include a fluid supply module 5. The fluid supply module 5 may supply a fluid, such as water.

The beverage maker may include ingredient supplier 3 provided with ingredient accommodation portions 31, 32, and 33 in which ingredients required for making a beverage may be accommodated. The beverage maker may include main channels 41 and 42 that connect the fluid supply module 5 to the fermentation module 1.

The beverage maker may include a beverage dispenser 6 that dispenses the beverage made in the fermentation module 1 to the outside. The beverage dispenser 6 may be connected to second main channel 42. Thus, the beverage dispensed from the fermentation module 1 may be guided to the beverage dispenser 6 by passing through a portion of the second main channel 42.

The beverage maker may further include a gas discharger 7. The gas discharger 7 may be connected to the fermentation module 1 to discharge a gas generated while the beverage is made.

The beverage maker may further include an air injector 8 that injects air. The air injector 8 may be connected to the fluid supply module 5 or first main channel 41. The air injector 8 may include an air injection pump 82.

The beverage maker may further include an air controller 15 that controls a pressure between an inner wall of a fermenter 112 and an outer surface of a fermentation container 12.

The beverage maker may further include a sub channel 91. The sub channel 91 may connect the fluid supply module 5 to the beverage dispenser 6.

The beverage maker may further include an air removal module 50 that removes air within a supply pump 52 of the fluid supply module 5.

Hereinafter, the fermentation module 1 will be described.

The fermentation module 1 may include a fermenter module 111 having an opening 170 and fermentation lid 107 that opens and closes the opening 170. The fermenter module 111 may include a fermentation case 160 and fermenter 112 accommodated in the fermentation case 160 and having an inner space S1. An insulation portion (not shown) may be provided between the fermentation case 160 and the fermenter 112. The fermenter module 111 may further include a lid seating body 179 on which the fermentation lid 107 may be seated.

Each of the fermentation case 160 and the fermenter 112 may be provided as an assembly of a plurality of members or components. The fermentation case 160 may define an outer appearance of the fermenter module 111.

The fermentation lid 107 may seal an inside of the fermenter module 111 and be disposed on the fermenter module 111 to cover the opening. A main channel, particularly, a main channel connection portion 115 connected to the second main channel 42 may be provided in the fermentation lid 107.

The fermentation container 12 may be accommodated in the fermenter 112. The fermentation container 12 may be provided as a separate container so that beverage ingredients and a made beverage do not stain the inner wall of the fermenter 112. The fermentation container 12 may be separably disposed on or in the fermenter 112. The fermentation container 12 may be seated on the fermenter 112 to ferment the beverage within the fermenter 112. After the fermentation container 12 is used, the fermentation container 12 may be withdrawn or removed from the fermenter 112.

The fermentation container 12 may be a pack containing ingredients for making a beverage. The fermentation container 12 may be made of a flexible material. Thus, the fermentation container 12 may be easily inserted into the fermenter 112 and be contracted and expanded by pressure. However, embodiments are not limited thereto. For example, the fermentation container 12 may be made of a polyethylene terephthalate (PET) material.

The fermentation container 12 may have a beverage making space S2 in which beverage ingredients may be accommodated, and a beverage made. The fermentation container 12 may have a size less than a size of the inner space S1 of the fermenter 112.

The fermentation container 12 may be inserted into and accommodated in the fermenter 112 in a state in which the ingredients are contained in the fermentation container 12. The fermentation container 12 may be inserted into the fermenter 112 and then accommodated in the fermenter 112 in a state in which the fermentation lid 107 is open.

The fermentation lid 107 may seal the fermenter 112 after the fermentation container 12 is inserted into the fermenter 112. The fermentation container 12 may assist fermentation of ingredients in the state in which the fermentation container 12 is accommodated in the space S1 sealed by the fermenter 112 and the fermentation lid 107. The fermentation container 12 may be expanded by the pressure therein during the making of the beverage. When air is supplied between the inner wall of the fermenter 112 and the outer surface of the fermentation container 12, the fermentation container 12 may be compressed by an inner pressure of the fermenter 112, and the beverage contained in the fermentation container 12 may be taken out.

The fermenter 112 may be disposed inside of the fermentation case 160. The fermenter 112 may have an outer circumference surface and a bottom surface, which may be spaced apart from an inner surface of the fermentation case 160. The outer circumference the fermenter 112 may be spaced apart from an inner circumference of the fermentation case 160, and an outer bottom surface of the fermenter 112 may be spaced apart from an inner bottom surface of the fermentation case 160.

An insulation portion (not shown) may be provided between the fermentation case 160 and the fermenter 112. The insulation portion may be disposed in the fermentation case 160 to surround the fermenter 112. Thus, a temperature of the fermenter 112 may be maintained constant. The insulation portion may be made of a material, such as foamed polystyrene or polyurethane, which has high thermal insulating performance and absorbs vibration.

The fermenter 112 may include a temperature sensor 16 that senses a temperature of the fermenter 112. The temperature sensor 16 may be mounted on a circumferential surface of the fermenter 112. The temperature sensor 16 may be disposed below an evaporator 134 wound around the fermenter 112.

Hereinafter, a temperature controller 11 will be described.

Temperature controller 11 may change a temperature of the fermenter 112. The temperature controller 11 may heat or cool the fermenter 112 to control the temperature of the fermenter 112 at an optimal temperature for fermenting the beverage.

The temperature controller 11 may include at least one of a refrigeration cycle device 13 or a heater 14. However, embodiments are not limited thereto. For example, the temperature controller 11 may include a thermoelement (TEM).

The refrigeration cycle device 13 may control the temperature of the fermenter 112. The refrigeration cycle device 13 may include a compressor, a condenser, an expansion mechanism, and the evaporator 134.

The evaporator 134 may contact an outer surface of the fermenter 112. The evaporator 134 may be an evaporation tube wound around the outer surface of the fermenter 112, for example. The evaporator 134 may be accommodated between the fermenter 112 and the insulation portion to cool the fermenter 112 which is insulated by the insulation portion.

The temperature controller 11 may further include heater 14 that heats the fermenter 112. The heater 14 may contact the bottom surface of the fermenter 112. The heater 14 may be a heat generation heater that generates heat when power is applied, for example. The heater 14 may be a plate heater, for example. Thus, natural convection of a fluid may be generated inside of the fermenter 112 by the evaporator 134 and the heater 14, and temperature distribution inside the fermenter 112 and the fermentation container 12 may be uniform.

Hereinafter, main channels 41 and 42 and a bypass channel 43 will be described.

The main channels 41 and 42 may include first main channel 41 that connects the fluid supply module 5 to the ingredient supplier 3 and second main channel 42 that connects the ingredient supplier 3 to the fermentation module 1. That is, the first main channel 41 may guide a fluid, such as water supplied from the fluid supply module 5 to the ingredient supplier 3, and the second main channel 42 may guide a mixture of the ingredients and the fluid, which are extracted from the ingredient supplier 3, to the fermentation module 1. The first main channel 41 may have one or a first end 41*a* connected to the fluid supply module 5 and the other or a second end connected to the ingredient supplier 3, more particularly, an inlet of an initial ingredient accommodation portion 31, which will be described hereinafter.

An ingredient supply valve 310 that opens and closes the first main channel 41 may be installed in the first main channel 41. The ingredient supply valve 310 may be provided in the ingredient supplier 3.

The ingredient supply valve 310 may be opened when additives accommodated in the ingredient accommodation portions 31, 32, and 33 are input to open the first main channel 41. The ingredient supply valve 310 may be opened when the ingredient accommodation portions 31, 32, and 33 are cleaned to open the first main channel 41.

The second main channel 42 may have one or a first end connected to main channel connection portion 115 of the fermentation module 1 and the other or a second end connected to the ingredient supplier 3, more particularly, an outlet 33*b* of a final ingredient accommodation portion 33, which will be described hereinafter.

A main valve 40 that opens and closes the second main channel 42 may be installed in the second main channel 42. A main check valve 314 that allows the fluid to flow from the ingredient supplier 3 to the fermentation module 1 may be installed in the second main channel 42. That is, the main check valve 314 may prevent the fluid from flowing back to the ingredient supplier 3.

The main check valve 314 may be disposed between the main valve 40 and the ingredient supplier 3 with respect to the second main channel 42. The main valve 40 may be opened when the fluid is supplied to the fermentation container 12 to open the second main channel 42. The main valve 40 may be closed while the fermenter 112 is cooled to close the second main channel 42. The main valve 40 may be opened when air is injected into the fermentation container 12 to open the second main channel 42. The main valve 40 may be opened when additives are supplied into the fermentation container 12 to open the second main channel 42. The main valve 40 may be closed to seal the inside of the fermentation container 12 during fermentation of ingredients. The main valve 40 may be closed to seal the inside of the fermentation container 12 when the beverage is aged and stored. The main valve 40 may be opened when the beverage is dispensed by the beverage dispenser 6 to open the second main channel 4. The beverage within the fermentation container 1 may pass through the main valve 40 to flow to the beverage dispenser 6.

The main channels 41 and 42 may be provided as one continuous channel when the beverage maker does not include the ingredient supplier 3. When the beverage maker includes the ingredient supplier 3, the beverage maker may further include bypass channel 43 configured to allow the fluid or air to bypass the ingredient accommodation portions 31 and 32.

The bypass channel 43 may bypass the ingredient accommodation portions 31, 32, and 33 and then be connected to the first main channel 41 and the second main channel 42.

The bypass channel 43 may have one or a first end 43*a* connected to the first main channel 41 and the other or a second end 43*b* connected to the second main channel 42. The bypass channel 43 may have the one end 43*a* connected to the first main channel 41 between the fluid supply module 5 and the ingredient supply valve 310 and the other end 43*b* connected to the second main channel 42 between the main valve 40 and the ingredient supplier 3.

A bypass valve 35 that opens and closes the bypass channel 43 may be installed in the bypass channel 43. The bypass valve 35 may be opened to open the bypass channel 43 when the fluid supplied from the fluid supply module 5 is supplied to the fermentation container 12. The bypass valve 35 may be opened to open the bypass channel 43 when air injected from the air injector 8 is supplied to the fermentation container 12. The bypass valve 35 may be opened to open the bypass channel 43 when the bypass channel 43 is cleaned.

A bypass check valve 324 that allows the fluid to flow from the first main channel 41 to the second main channel 42 may be installed in the bypass channel 43. That is, the fluid may flow only from the first main channel 41 to the second main channel 42 but may not flow in the opposite direction. The bypass check valve 324 may be disposed between the bypass valve 35 and the second main channel 42 with respect to the bypass channel 43.

Hereinafter, the ingredient supplier 3 will be described.

When beer is made using the beverage maker, the ingredients for making the beer may include a fluid, such as water, malt, a fermentation facilitator, for example, yeast, hop, and a flavoring additive, for example. The beverage maker may include both the ingredient supplier 3 and the fermentation container 12. The ingredients for making the beverage may be accommodated in and divided between the ingredient supplier and the fermentation container 12. A portion of the ingredients for making the beverage may be accommodated in the fermentation container 12, and the remaining ingredients may be accommodated in the ingredient supplier 3. The remaining ingredients accommodated in the ingredient supplier 3 may be supplied to the fermentation container 12 together with the fluid supplied from the fluid supply module 5 and mixed with the portion of the ingredients accommodated in the fermentation container 12.

A main ingredient which is essential for making a beverage may be accommodated in the fermentation container 12, and additives added to the main ingredient may be accommodated in the ingredient supplier 3. In this case, the additives accommodated in the ingredient supplier 3 may be mixed with the fluid supplied from the fluid supply module 5 and supplied to the fermentation container 12 and then may be mixed with the main ingredient accommodated in the fermentation container 12.

The main ingredient accommodated in the fermentation container 12 may have a capacity or amount greater than a capacity or amount of other ingredients. For example, when beer is made, the main material may be malt of the malt, the fermentation facilitator, the hop, and the flavoring additive. Also, the additives accommodated in the ingredient supplier 3 may be the other ingredient except for the malt of the ingredients for making the beer, for example, the fermentation facilitator, the hop, and the flavoring additive.

The beverage maker may not include the ingredient supplier 3 but may include only the fermentation container 12. In this case, the main ingredient may be accommodated in the fermentation container 12, and a user may directly put the additives into the fermentation container 12.

If the beverage maker includes both the ingredient supplier 3 and the fermentation container 12, the beverage may be more easily made. Hereinafter, a case in which the beverage maker includes both the ingredient supplier 3 and the fermentation container, will be described as an example. However, embodiments are not limited to the case in which the beverage maker includes both the ingredient supplier 3 and the fermentation container 12.

The ingredients within the fermentation container 12 may be fermented as time elapses, and the beverage made in the fermentation container 12 may flow to the second main channel 42 through the main channel connection portion 115 and also flow from the second main channel 42 to the beverage dispenser 6 so as to be dispensed. The ingredients necessary for making the beverage may be accommodated in the ingredient supplier 3, and the fluid supplied from the fluid supply module 5 may pass through ingredient supplier 3. For example, when the beverage made in the beverage maker is beer, the ingredients accommodated in the ingredient supplier 3 may be the fermentation facilitator, the hop, and the flavoring additive, for example.

The ingredients accommodated in the ingredient supplier 3 may be directly accommodated in the ingredient accommodation portions 31, 32, and 33 provided in the ingredient supplier 3. At least one ingredient accommodation portion 31, 32, and 33 may be provided in the ingredient supplier 3. Further, a plurality of ingredient accommodation portions 31, 32, and 33 may be provided in the ingredient supplier 3. In this case, the ingredient accommodation portions 31, 32, and 33 may be partitioned with respect to each other.

Inlets 31a, 32a, and 33a through which fluid may be introduced and outlets 31b, 32b, and 33b through which the fluid may be discharged may be provided in the ingredient accommodation portions 31, 32, and 33, respectively. The fluid introduced into the inlet of one ingredient accommodation portion may be mixed with ingredients within the ingredient accommodation portion and then discharged through the outlet.

The ingredients accommodated in the ingredient supplier 3 may be accommodated in ingredient containers C1, C2, and C3. In this case, the ingredient containers C1, C2, and C3 may be accommodated in the ingredient accommodation portions 31, 32, and 33, and each of the ingredient accommodation portions 31, 32, and 33 may be referred to as an "ingredient container mounting portion".

The ingredient containers C1, C2, and C3 may each include a capsule or a pod; however, embodiments are not limited thereto. When the ingredients are accommodated in the ingredient containers C1, C2, and C3, the ingredient supplier 3 may be configured so that the ingredient containers C1, C2, and C3 are seated therein and withdrawn therefrom. The ingredient supplier 3 may be provided as an ingredient containers kit assembly in which the ingredient containers C1, C2, and C3 are separably accommodated.

For example, a first additive, a second additive, and a third additive may be accommodated in the ingredient supplier 3. The first additive may be the fermentation facilitator, the second additive may be the hop, and the third additive may be the flavoring additive. The ingredient supplier 3 may include a first ingredient container mounting portion 31 in which a first ingredient container C1 containing the first additive is accommodated, a second ingredient container mounting portion 32 in which a second ingredient container C2 containing the second additive is accommodated, and a third ingredient container mounting portion 33 in which a third ingredient container C3 containing the third additive is accommodated.

The ingredients contained in the ingredient accommodation portion or the ingredient containers C1, C2, and C3 may be extracted by a fluid pressure of the fluid supplied from the fluid supply module 5. When the ingredients are extracted by the fluid pressure, the fluid supplied from the fluid supply module 5 to the first main channel 41 may pass through the ingredient accommodation portion or the ingredient containers C1, C2, and C3 and then be mixed with the ingredients, and the ingredients accommodated in the ingredient accommodation portion or the ingredient containers C1, C2, and C3 may flow to the second main channel together with the fluid.

A plurality of additives different from each other may be accommodated separately in the ingredient supplier 3. For example, when beer is made, the plurality of additives accommodated in the ingredient supplier 3 may be the fermentation facilitator, the hop, and the flavoring additive, which may be accommodated separately from each other.

When the plurality of ingredient accommodation portions are provided in the ingredient supplier 3, the plurality of ingredient accommodation portions 31, 32, and 33 may be connected in series to each other in a flow direction of the fluid. That is, the ingredient supplier 3 may include at least one connecting channel 311 and 312 that connects the outlet of one ingredient accommodation portion of the plurality of ingredient accommodation portions 31, 32, and 33 to the inlet of another ingredient accommodation portion.

Further, the plurality of ingredient accommodation portions 31, 32, and 33 may include an initial ingredient accommodation portion 31 and a final ingredient accommodation portion 33. The plurality of ingredient accommodation portions 31, 32, and 333 may further include an intermediate ingredient accommodation portion 32.

The inlet 31a of the initial ingredient accommodation portion 31 may be connected to the first main channel 41, and the outlet 33b of the final ingredient accommodation portion 33 may be connected to the second main channel 42. The intermediate ingredient accommodation portion 32 may be disposed between the first ingredient accommodation portion 31 and the second ingredient accommodation portion 33 in the flow direction of the fluid. The inlet 32a and the outlet 32b of the intermediate ingredient accommodation portion 32 may be connected to the connecting channels 311 and 312 different from each other.

As illustrated in FIG. 1, when three ingredient accommodation portions are provided in the ingredient supplier 3, the outlet 31b of the final ingredient accommodation portion 31 may be connected to the inlet 32a of the intermediate ingredient accommodation portion 32 through the first connecting channel 311, and the outlet 32b of the intermediate ingredient accommodation portion 32 may be connected to the inlet 33a of the final ingredient accommodation portion 33 through the second connecting channel 312. In this case, the fluid introduced into the inlet 31a of the final ingredient accommodation portion 31 through the first main channel 41 may flow to the first connecting channel 311 through the outlet 31b together with the first additive accommodated in the initial ingredient accommodation portion 31.

The fluid (a mixture of the fluid and the first additive) introduced into the inlet 32a of the intermediate ingredient accommodation portion 32 through the first main channel 311 may flow to the second connecting channel 312 through the outlet 32b together with the second additive accommodated in the intermediate ingredient accommodation portion 32. The fluid (the mixture of the fluid and the first and second additives) introduced into the inlet 33a of the final ingredient accommodation portion 33 through the second main channel 312 may flow to the second connecting channel 42 through the outlet 33b together with the third additive accommodated in the final ingredient accommodation portion 33. The fluid (the mixture of the fluid and the first, second, and third additives) discharged through the second main channel 42 may be guided to the main channel connection portion 115 of the fermentation module 1 and then introduced into the fermentation container 12.

However, the configuration of the ingredient supplier 3 is not limited thereto. For example, when the intermediate ingredient accommodation portion is not provided, two ingredient accommodation portions may be provided in the ingredient supplier 3. In this case, one ingredient accommodation portion may be the initial ingredient accommodation portion, and the other ingredient accommodation portion may be the final ingredient accommodation portion. The outlet of the initial ingredient accommodation portion and the inlet of the final ingredient accommodation portion may be connected to each other by the connecting channel.

For another example, when a plurality of intermediate ingredient accommodation portions is provided, four or more ingredient accommodation portions may be provided in the ingredient supplier 3. In this case, one ingredient accommodation portion may be the initial ingredient accommodation portion, another ingredient accommodation portion may be the final ingredient accommodation portion, and the remaining ingredient accommodation portions may be intermediate ingredient accommodation portions. In this case, as the connection between the ingredient accommodation portions in series is easily understood by a person skilled in the art, their detailed descriptions has been omitted.

As the plurality of ingredient accommodation portions 31, 32, and 33 is connected in series to each other, a channel configuration of the ingredient supplier 3 may be simplified. Also, as additives contained in the ingredient containers C1, C2, and C3 are extracted at once, a time taken to extract the additives may decrease. Also, the ingredient supplier 3 may minimize fluid leakage points to improve reliability.

When the ingredients accommodated in the ingredient supplier 3 are accommodated in the ingredient containers C1, C2, and C3, the initial ingredient accommodation portion 31 may be referred to as an "initial ingredient container mounting portion", the intermediate ingredient accommodation portion 32 may be referred to as an "intermediate ingredient container mounting portion", and the final ingredient accommodation portion 33 may be referred to as a "final ingredient container mounting portion".

Hereinafter, the fluid supply module 5 will be described.

The fluid supply module 5 may include a tank 51, a pump 52 to pump a fluid, such as water within the tank 51, and a heater 53 that heats the fluid pumped by the pump 52. The tank 51 and the pump 52 may be connected to a tank discharge channel 55a, and the fluid contained in the tank 51 may be introduced into the pump 52 through the tank discharge channel 55a. The pump 52 and one or a first end of the first main channel 41 may be connected to a fluid supply channel 55b, and the fluid discharged from the pump 52 may be guided to the first main channel 41 through the fluid supply channel 55b.

A muffler 56a that reduces noise and a flow meter 56b that measures a flow rate of the fluid discharged from the tank 51 may be installed in the tank discharge channel 55a. The muffler 56a may be disposed in front of the flow meter 56b with respect to the flow direction of the fluid.

A flow rate control valve 54 that controls a flow rate of the fluid discharged from the tank 51 may be installed in the tank discharge channel 55a. The flow rate control valve 54 may include a step motor.

A thermistor 54a that measures a temperature of the fluid discharged from the tank 51 may be installed in the tank discharge channel 55a. The thermistor 54a may be built in the flow rate control valve 54.

A fluid supply check valve 59 that prevents the fluid from flowing back to the pump 52 may be installed in the fluid supply channel 55b.

The heater 53 may be installed in the fluid supply channel 55b. The heater 53 may be include a thermostat 58 that constantly adjusts a temperature of the heater 53.

The fluid supply module 5 may further include a safety valve 53a. The safety valve 53a may communicate with an inside of the heater 53. The safety valve 53a may restrict a maximum inner pressure of the heater 53. For example, the safety valve 53a may restrict the maximum inner pressure of the heater 53 to a pressure of about 3.0 bar.

The fluid supply module 5 may further include a fluid supply temperature sensor 57 that measures a temperature of the fluid passing through the heater 53. The fluid supply temperature sensor 57 may be connected to the heater 53.

When the pump 52 is driven, the fluid within the tank 51 may be introduced into the pump 52 through the tank discharge channel 55a, and the fluid discharged from the pump 52 may be heated in the heater 53 while flowing through the water supply channel 55b and then be guided to the first main channel 41.

Hereinafter, the beverage dispenser 6 will be described.

The beverage dispenser 6 may be connected to the second main channel 42. That is, the beverage dispenser 6 may include dispenser 62 that dispenses the beverage and a beverage dispensing channel 61 that connects the dispenser 62 to the second main channel 42.

The beverage dispensing channel 61 may connect the second main channel 42 to the dispenser 62. The beverage dispensing channel 61 may have one or a first end 61a connected between the main check valve 314 and the main valve 40 with respect to the second main channel 42 and the other or a second end connected to the dispenser 62.

A beverage dispensing valve 64 that opens and closes the beverage dispensing channel 61 may be installed in the beverage dispensing channel 61. The beverage dispensing valve 64 may be opened when the beverage is dispensed to open the beverage dispensing channel 61. The beverage dispensing valve 64 may be opened when residual fluid is removed to open the beverage dispensing channel 61. The beverage dispensing valve 64 may be opened when the beverage dispenser is cleaned to open the beverage dispensing channel 61.

A decompression component 60 that prevents a pressure of the beverage passing through the beverage dispensing channel 61 from rapidly increasing may be installed in the beverage dispensing channel 61. The decompression component 60 may be installed behind the beverage dispensing valve 64 with respect to the dispensing direction of the beverage. The decompression component 60 may be disposed adjacent to the beverage dispensing valve 64.

The pressure of the beverage passing through the decompression component 60 may gradually decrease. The beverage passing through the decompression component 60 may be dispensed from the dispenser 62 and may not generate excessive bubbles.

When the beverage is dispensed, the beverage dispensing valve 64 may be opened. When the beverage is not dispensed, the beverage dispensing valve 64 may remain closed.

The dispenser 62 may include lever 620. When the user manipulates the lever 620, the beverage dispensing valve 64 may be opened, and when the lever 620 returns to its original position, the beverage dispensing valve 64 may be closed.

Hereinafter, the gas discharger 7 will be described.

The gas discharger 7 may be connected to the fermentation module 1 to discharge a gas generated in the fermentation container 12. The gas discharger 7 may include a gas discharge channel 71 connected to the fermentation module 1, a gas pressure sensor 72 installed in the gas discharge channel 71, and a gas discharge valve 73 connected to the gas discharge channel 71. The gas discharge valve 73 may be disposed behind or downstream of the gas pressure sensor 72 in a gas discharge direction.

The gas discharge channel 71 may be connected to the fermentation module 1, particularly, the fermentation lid 107. A gas discharge channel connection portion 121 to which the gas discharge channel 71 may be connected may be provided in the fermentation lid 107.

The gas within the fermentation container 12 may flow into the gas discharge channel 71 through the gas discharge channel connection portion 121. The gas pressure sensor 72 may detect a pressure of the gas discharged to the gas discharge channel 71 through the gas discharge channel connection portion 121 within the fermentation container 12.

The gas discharge valve 73 may be turned on to be opened when air is injected into the fermentation container 12 by the air injector 8. The beverage maker may uniformly mix the malt with the fluid by injecting the air into the fermentation container 12. Foam generated in the liquid malt may be discharged from an upper portion of the fermentation container 12 to the outside through the gas discharge channel 71 and the gas discharge valve 73. The gas discharge valve 73 may be opened or closed at least one time to detect fermentation during a fermentation process or operation.

The gas discharger 7 may further include a safety valve 75 connected to the gas discharge channel 71. The safety valve 75 may be disposed behind or downstream of the gas pressure sensor 72 with respect to the gas flow direction.

The safety valve 75 may restrict a maximum pressure of the fermentation container 12 and the gas discharge channel 71. For example, the safety valve 75 may restrict the maximum pressure of the fermentation container 12 and the gas discharge channel 71 to a pressure of about 3.0 bar.

The gas discharger 7 may further include a pressure release valve 76. The pressure release valve 76 may be connected to the gas discharge channel 71. The pressure release valve 76 and the gas discharge valve 73 may be selectively opened/closed. The pressure release valve 76 may be disposed behind or downstream of the gas pressure sensor 72 with respect to the gas flow direction.

A noise reducing device 77 may be mounted on the pressure release valve 76. The noise reducing device 77 may include at least one of an orifice structure or a muffler structure.

Even though the pressure release valve 76 is opened, an inner pressure of the fermentation container 12 may be gradually decreased by the noise reducing device 77. When fermentation of the beverage progresses, the pressure release valve 76 may be opened to release the pressure in a state in which the inner pressure of the fermentation container 12 increases. The noise reducing device 77 may effectively reduce noise generated due to a difference in pressure between the inside and outside of the fermentation container 12. The pressure release valve 76 may be opened/closed in the fermentation process or operation in which the inner pressure is relatively high.

Hereinafter, the air injector 8 will be described.

The air injector 8 may be connected to the fluid supply module 5 or the first main channel 41 to inject air. The air injector 8 may be connected to an opposite side of a sub channel 91, which will be described hereinafter, with respect to the heater 53.

In this case, air injected by the air injector 8 may pass through the heater 53 to flow to the sub channel 91 together with residual fluid within the heater 53. Thus, the residual fluid within the heater 53 may be removed to maintain a clean state of the heater 53.

Alternatively, air injected by the air injector 8 to the first main channel 41 may successively pass through the bypass channel 43 and the second main channel 42 and then be injected into the fermentation container 12. Thus, stirring or aeration may be performed in the fermentation container 12.

Alternatively, the air injected from the air injector 8 to the first main channel 41 may be guided to the ingredient supplier 3 to flow to the ingredient container mounting portions 31, 32, and 33. Residual fluid or residue within the ingredient containers C1, C2, and C3 or the ingredient container mounting portions 31, 32, and 33 may flow to the second main channel 42 by the air injected by the air injector 8 and then be discharged to the beverage dispenser 6. The ingredient containers C1, C2, and C3 and the ingredient container mounting portions 31, 32, and 33 may be cleanly maintained by the air injected by the air injector 8.

The air injector 8 may include an air injection channel connected to the fluid supply channel 55b or the first main channel 41 and air injection pump 82 connected to the air injection channel 81. An air injection check valve 83 that prevents the fluid within the fluid supply channel 55b from being introduced into the air injection pump 82 through the air injection channel 81 may be installed in the air injection channel 81.

The air injection pump 82 may pump the air to the air injection channel 81. A discharge portion of the air injection pump 82 may be connected to the air injection channel 81.

Air passing through an air filter 150 may be suctioned into a suction portion of the air injection pump 82. That is, the beverage maker may include air filter 150 and an air suction channel 152 connected to the air filter 150. A muffler 150a that reduces noise generated when the air is suctioned may be installed in the air suction channel 152.

The air suction channel 152 may be branched into a first suction channel 84 and a second suction channel 153. The first suction channel 84 may be connected to a suction portion of the air injection pump 82, and the second suction channel 153 may be connected to a suction portion of an air supply pump 151 described hereinafter. However, embodiments are not limited thereto, and thus, air passing through different filters may be suctioned into the suction portion of the air injection pump 82 and the suction portion of the air supply pump 151.

Hereinafter, the air controller 15 will be described.

The air controller 15 may control a pressure between the inner wall of the fermenter 112 and the outer surface of the fermentation container 12. The air controller 15 may supply air into the space between the fermentation container 12 and the fermenter 112. On the other hand, the air controller 15 may exhaust the air within the space between the fermentation container 12 and the fermenter 112 to the outside.

The air conditioner 15 may include air supply pump 151, an air supply channel 154 that connects the air supply pump 151 to the fermentation module 1, an exhaust channel 157 connected to the air supply channel 154 to exhaust air to the outside, and an exhaust valve 156 connected to the exhaust channel 157. The air supply pump 151 may inject air into the air supply channel 154. A discharge portion of the air supply pump 151 may be connected to the air supply channel 154, and a suction portion may be connected to the second suction channel 153 described above.

The air supply channel 154 may be connected to the fermentation module 1, particularly, the fermentation lid 107. An air supply channel connection portion 117 to which the air supply channel 154 may be connected may be provided in the fermentation module 1. The air supply channel connection portion 117 may communicate with the space between the inner wall of the fermenter 112 and the outer surface of the fermentation container 12.

The air injected from the air supply pump 151 to the air supply channel 154 may be guided between the outer surface of the fermentation container 12 and the inner wall of the fermenter 112. The air supplied into the fermenter 112 may press the fermentation container 12 between the outer surface of the fermentation container 12 and the inner wall of the fermenter 112.

The beverage within the fermentation container 12 may be pressed by the fermentation container 12 which is contracted by the air. When the main valve 40 and the beverage dispensing valve 64 are opened, the beverage may pass through the main channel connection portion 115 to flow to the second main channel 42. The beverage flowing from the fermentation container 12 to the second main channel 42 may be dispensed to the outside through the beverage dispenser 6.

The air supply pump 151 may supply air so that a predetermined pressure occurs between the fermentation container 12 and the fermenter 112. Thus, a pressure at which the beverage within the fermentation container 12 is easily dispensed may be occur between the fermentation container 12 and the fermenter 112.

The air supply pump 151 may be maintained in a turned-off state while the beverage is dispensed. When the beverage is completely dispensed, the air pump 82 may be driven for next beverage dispensing and then stopped. Thus, the beverage maker may dispense the beverage to the beverage dispenser 6 in a state in which the fermentation container 12 is disposed within the fermentation module 1 without withdrawing the fermentation container 12 to the outside of the fermentation module 1.

The exhaust channel 157 may function as an air exhaust passage, through which the air between the fermentation container 12 and the fermenter 112 may be exhausted to the outside, together with a portion of the air supply channel 154. The exhaust channel 157 may be disposed outside of the fermentation module 1. The exhaust channel 157 may be connected to a portion of the air supply channel 154, which is disposed outside of the fermenter 112.

The air supply channel 154 may include a first channel connected between the air supply pump 151 to a connection portion 157a, to which the exhaust channel 157 may be connected, and a second channel between a connection portion 154a, to which the exhaust channel 157 may be connected, and the air supply channel connection portion 117. The first channel may be an air supply channel that guides the air pumped by the air supply pump 151 to the second channel. Also, the second channel may be an air supply and exhaust-combined channel that supplies the air passing through the air supply channel into the space between the fermenter 112 and the fermentation container 12 or guides the air discharged from the space between the fermenter 112 and the fermentation container 12 to the exhaust channel 157.

The exhaust channel 157 may exhaust air therethrough. The exhaust valve 156 may be opened so that the air between the fermentation container 12 and the fermenter 112 may be exhausted to the outside when the fermentation container 12 is expanded while the beverage is made. The exhaust valve 156 may be opened when fluid is supplied by the fluid supply module 5. The exhaust valve 156 may be opened when air is injected by the air injector 8.

The exhaust valve 156 may be opened so that the air between the fermentation container 12 and the fermenter 112 may be exhausted when the beverage within the fermentation container 12 is completely dispensed. The user may take the fermentation container 12 out of the fermenter 112 when the beverage is completely dispensed. This is done because safety accidents occur when the inside of the fermenter 112 is maintained at a high pressure. The exhaust valve 156 may be opened when the beverage within the fermentation container 12 is completely dispensed.

The air controller 15 may further include an air restriction valve 159 that restricts the air pumped by the air supply pump 151 and supplied between the fermentation container 12 and the fermenter 112. The air restriction valve 159 may be a check valve.

The air restriction valve 159 may be installed in the air supply channel 154. That is, the air restriction valve 159 may be installed between the air supply pump 151 of the air supply channel 154 and the connection portion 157a of the exhaust channel 157.

Hereinafter, the sub channel 91 will be described.

The sub channel 91 may connect the fluid supply module 5 to the beverage dispenser 6. The sub channel 91 may have one or a first end 91a connected to the fluid supply channel 55b and the other or a second end 91b connected to the beverage dispensing channel 61.

The sub channel 91 may be connected between the pump 52 and the heater 53 with respect to the fluid supply channel 55b. The sub channel 91 may be connected to the connection portion 61a of the second main channel 42 and the beverage dispensing valve 64 with respect to the beverage dispensing channel 61.

The fluid supplied by the pump 52 and the air pumped by the air injection pump 82 may be guided to the beverage dispensing channel 61 through the sub channel 91 and then dispensed to the dispenser 62. Thus, residual fluid or beverage remaining in the beverage dispenser 6 may be removed.

A sub valve 92 that opens and closes the sub channel 91 may be installed in the sub channel 91. The sub valve 92 may be opened to open the sub channel 91 when the beverage is dispensed, or cleaning is performed.

A sub check valve 93 that prevents the beverage of the beverage dispensing channel 61 from flowing back to the fluid supply module 5 may be installed in the sub channel 91. The sub check valve 93 may be disposed between the sub valve 92 and the beverage dispensing channel 61 with respect to the sub channel 91.

The sub channel 91 may function as a residual fluid removing channel of the fluid supply module 5. For example, when the air injection pump 82 is turned on in a state in which the bypass valve 35 and the ingredient supply valve 310 are closed, the sub valve 92 is opened, the air injected into the air injection channel 81 may pass through the heater 53 to flow to the sub channel 91. Then, the air may pass through the sub valve 92 to flow to the beverage dispensing channel 61 and then be dispensed to the dispenser 62. In this process, the air may be dispensed together with the fluid supply module 5, more particularly, residual fluid remaining in the heater 53 and the fluid supply channel 55b so that residual fluid may be removed.

The sub channel 91 may also function as a cleaning channel. When a portion of the beverage is dispensed from the dispenser 62, and a long time has elapsed until the next dispensing, the dispenser 62 may be cleaned by allowing fluid to flow into the sub channel 91 before performing the next dispensing.

Hereinafter, the air removal module 50 will be described.

The pump 52 may include a gear pump. As the gear pump is used, a lubricant (grease) applied to a surface of an inner rotor and an inner wall of the pump may be gradually exhausted. Then, when used over a certain number of times, a pressure difference between an inlet and an outlet of the pump 52, which is generated by the gear pump, may gradually decrease. The inlet of the pump 52 may be connected to the tank discharge channel 55a, and the outlet may be connected to the fluid supply channel 55b.

The air removal module 50 may temporarily remove flow path resistance acting on the pump 52. That is, the air in the pump 52 may be removed by the air removal module 50, and instead, the fluid in the tank 51 may be introduced into the pump 52 by a head pressure. Thus, the pump 52 may smoothly supply fluid through the fluid supply channel 55b.

The air removal module 50 may include an air removal channel 50a and an air removal valve 50b connected to the air removal channel 50a. The air removal channel 50a may be connected to the fluid supply channel 55b. That is, the air removal channel 50a may be branched from the fluid supply channel 55b.

The air removal channel 50a may be connected to a point on the fluid supply channel 55b, which is adjacent to the pump 52. For example, the air removal channel 50a may be connected between the pump 52 and the heater 53 in the fluid supply channel 55b. In this case, the connection portion between the air removal channel 50a and the fluid supply channel 55b may be closer to the pump 52 than the heater 52.

The air removal valve 50b may include a solenoid valve. When the air removal valve 50b is opened, the air removal channel 50a may be opened, and air in the air removal channel 50a may be discharged to the outside through the air removal valve 50b. As a result, the air in the pump 52 may flow into the air removal channel 50a, and the fluid in the tank 51 may be introduced into the pump 52 by the head pressure.

The beverage maker may maintain the air removal valve 50b in a closed state when the pump 52 operates so that the fluid does not flow through the fluid supply channel 55b. In a state in which operation of the pump 52 is stopped, the air removal valve 50b may be opened. The beverage maker may allow the pump 52 to operate after the air removal valve 50b is opened for a predetermined period of time, and the air removal valve 50a is closed when the tank 51 is empty to refill the tank 51.

Figure 2:
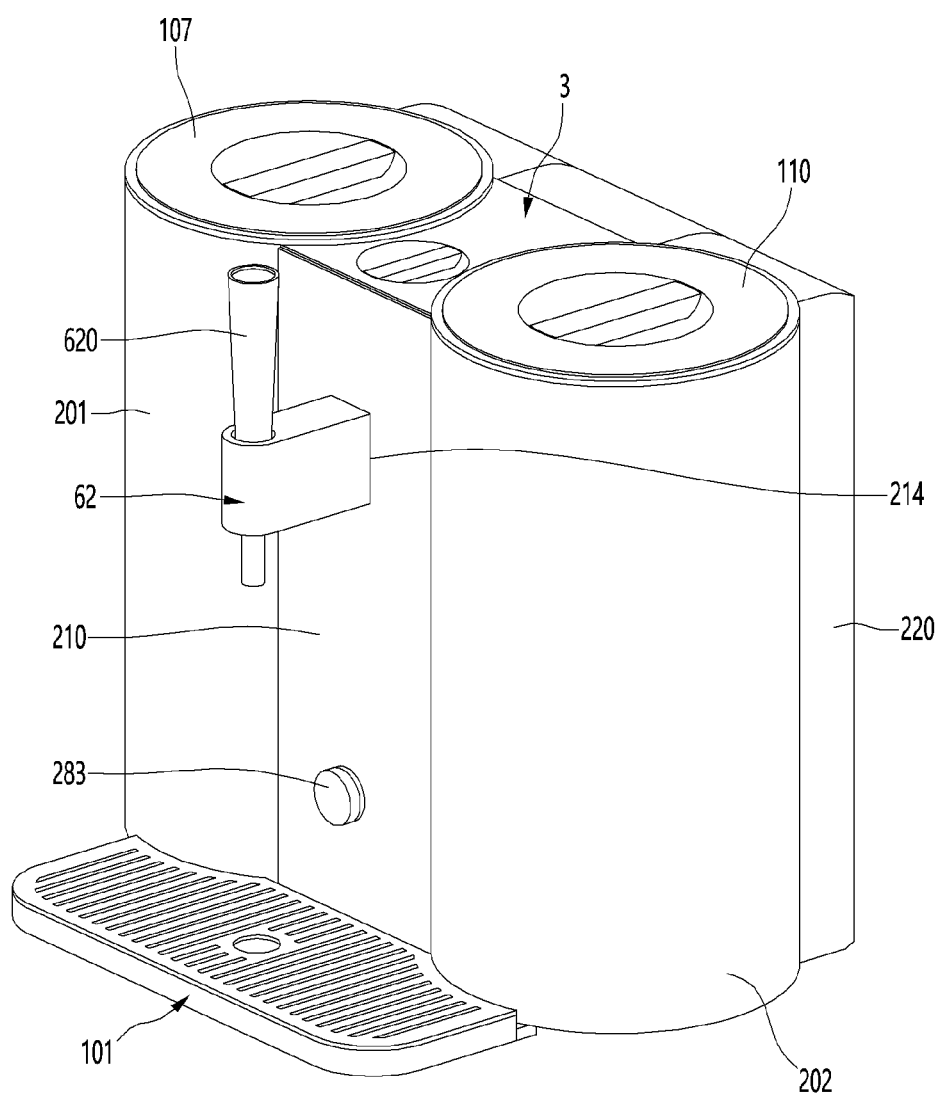
FIG. 2 is a perspective view of a beverage maker according to an embodiment.
Figure 3:
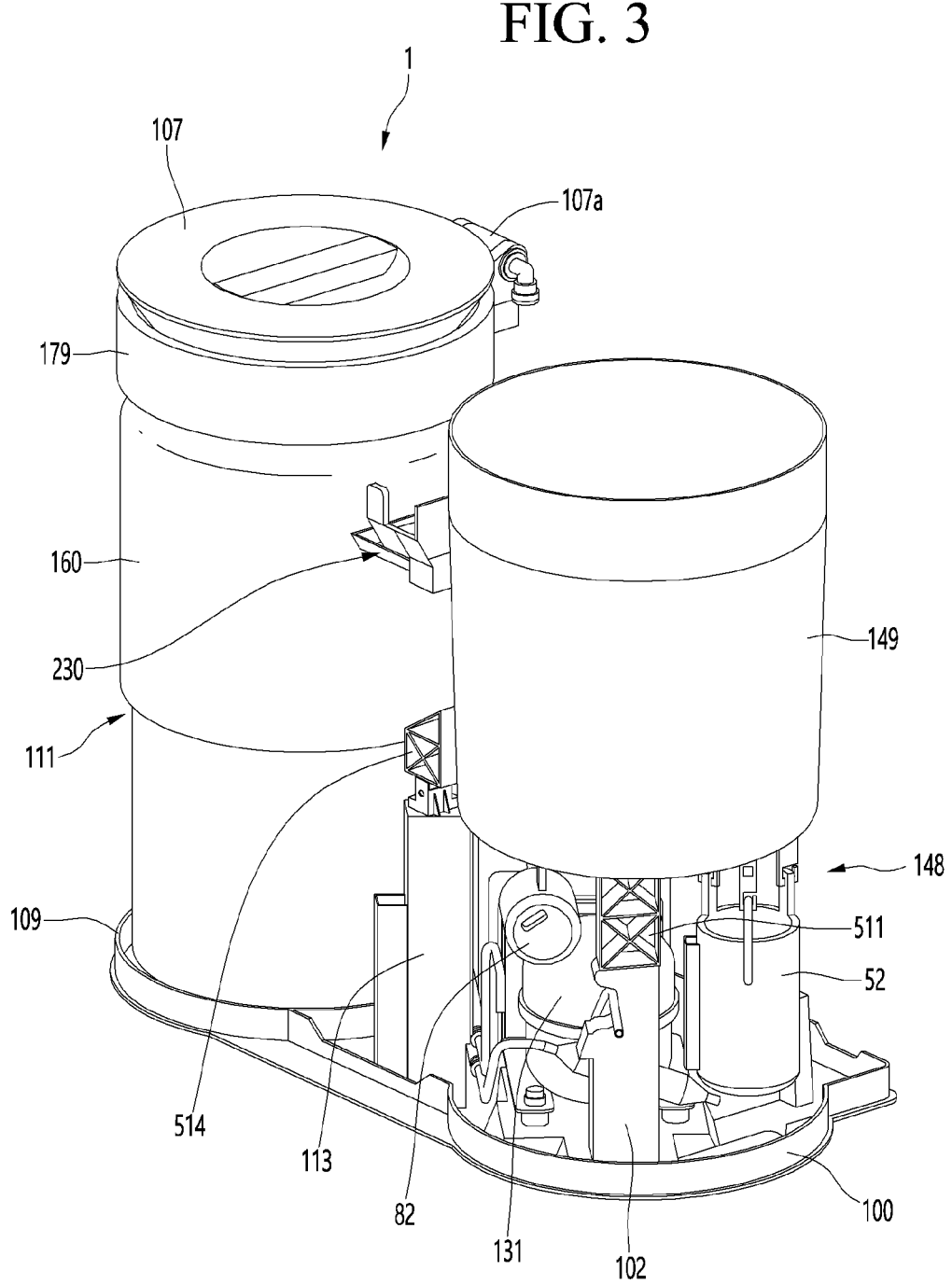
FIG. 3 is a perspective view illustrating a state in which a cover, a residual fluid tray, and an ingredient supplier are removed in the beverage maker of FIG. 2.
Figure 4:
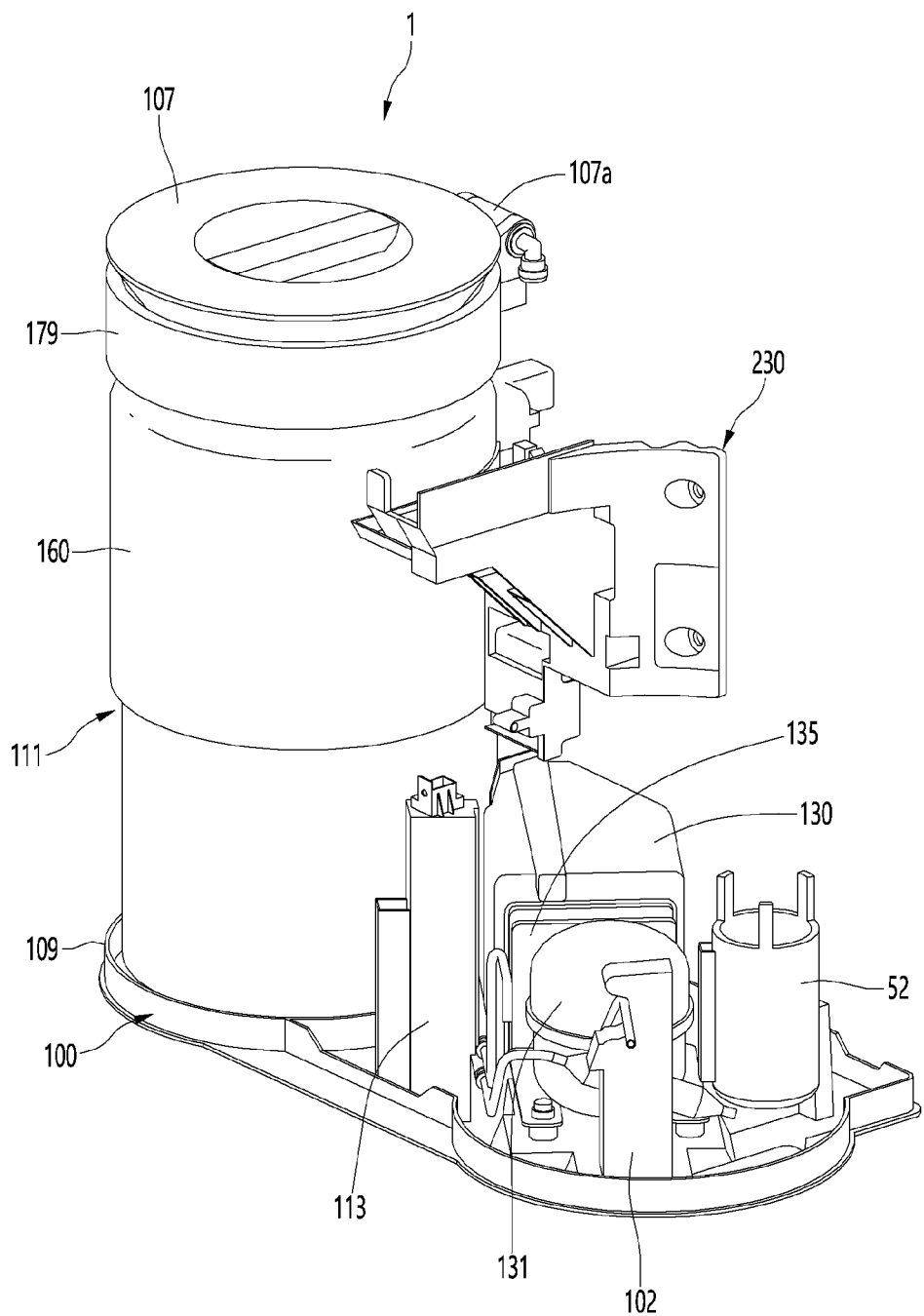
FIG. 4 is perspective view illustrating a state in which a tank case is removed in the beverage maker of FIG. 3.
Figure 5:
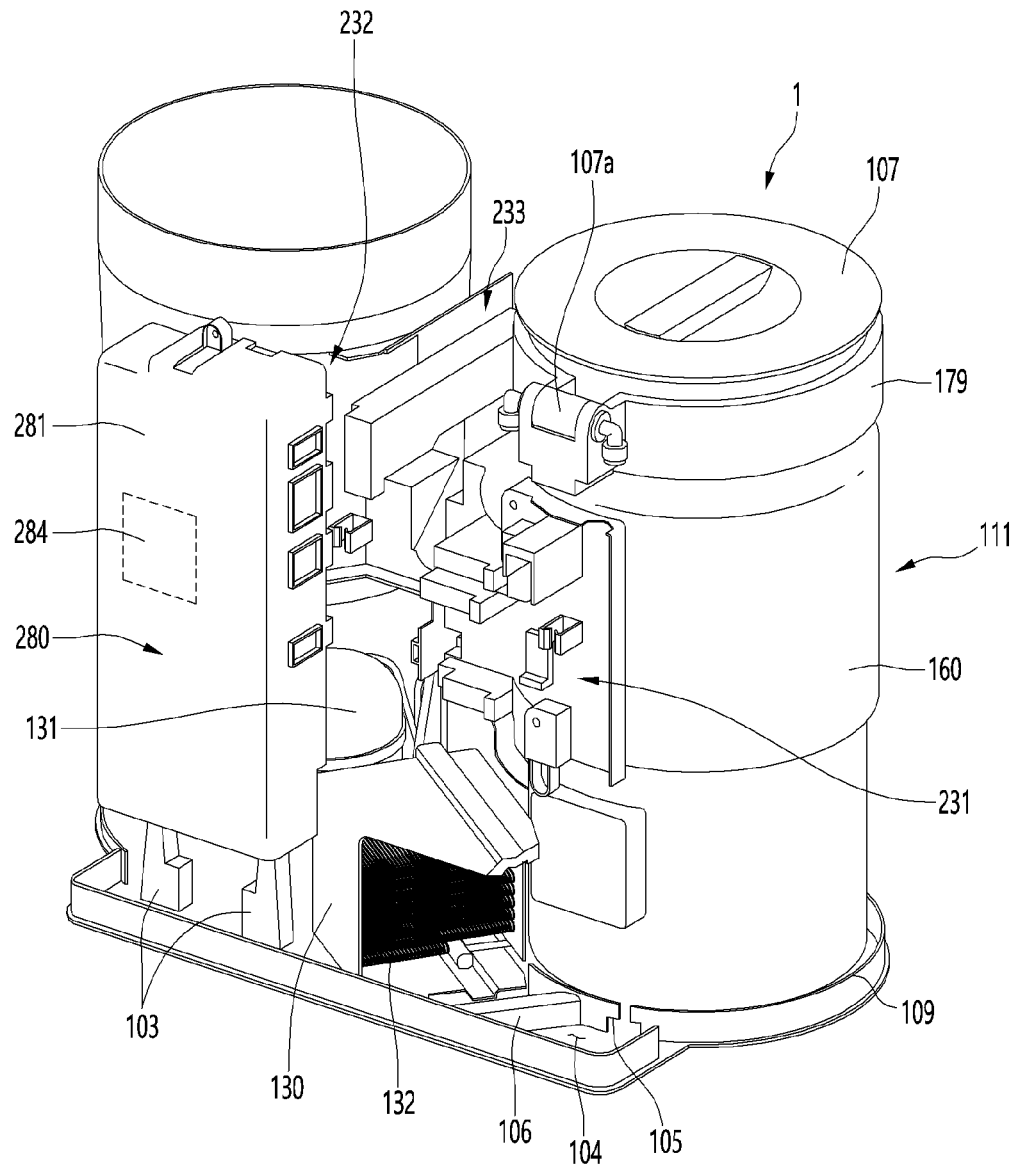
FIG. 5 is a rear perspective view of the beverage maker of FIG. 3.
Figure 6:
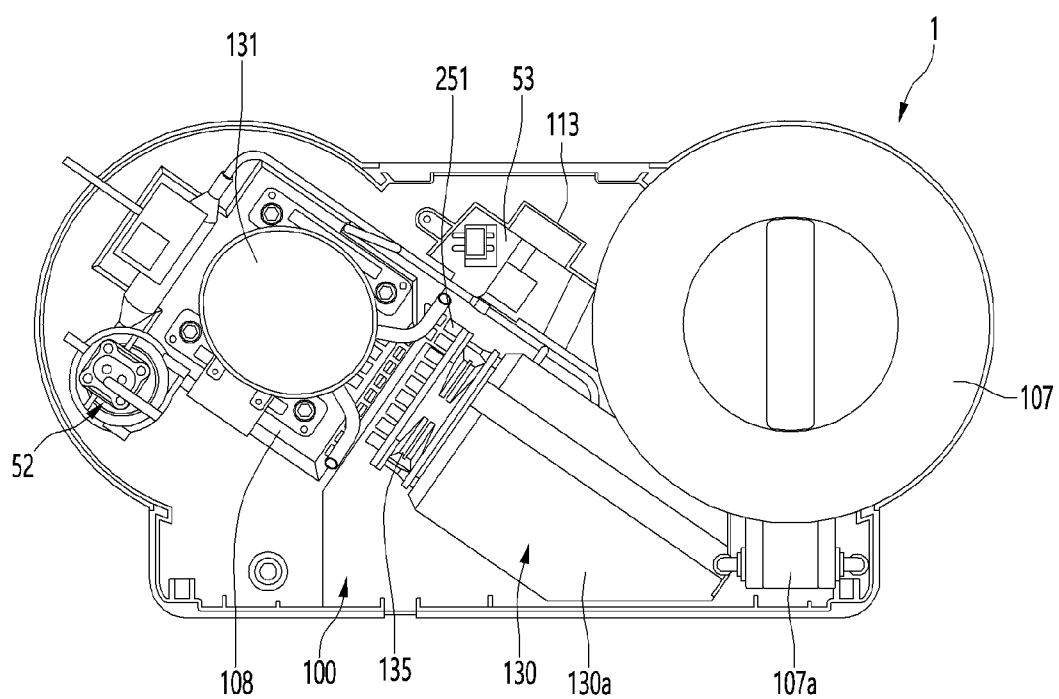
FIG. 6 is a plan view illustrating a state in which a main frame is removed in the beverage maker of FIG. 4.

FIG. 2 is a perspective view of a beverage maker according to an embodiment. FIG. 3 is a perspective view illustrating a state in which a cover, a residual fluid tray, and an ingredient supplier are removed in the beverage maker of FIG. 2. FIG. 4 is perspective view illustrating a state in which a tank case is removed in the beverage maker of FIG. 3. FIG. 5 is a rear perspective view illustrating the beverage maker of FIG. 3. FIG. 6 is a plan view illustrating a state in which a main frame is removed in the beverage maker of FIG. 4.

The beverage maker may include a base 100. The base 100 may constitute an outer appearance of a bottom surface of the beverage maker and support the fermentation module 1, the tank 51, the heater 53, and a main frame 130, which are disposed thereabove. As necessary, components supported by the base 100 may be added, removed, or changed.

The beverage maker may further include a residual fluid tray 101 that receives and stores a beverage dropping from the dispenser 62. The residual fluid tray 101 may be integrated with the base 100 or be coupled to the base 10. The residual fluid tray 101 may be disposed in front of the base 100.

The fermentation module 1 may have an approximately cylindrical shape. The fermentation module 1 may be supported by the base 100 at a lower side.

The fermentation module 1 may be disposed above the base 100. The fermentation module 1 may be disposed and supported on a fermentation module support portion or support 109 of the base 100.

As described above, the fermentation module 1 may include fermenter module 111 and fermentation lid 107. Fermentation container 12 (see FIG. 1) may be accommodated in the fermenter module 111.

Fermenter 112 (see FIG. 1) may be accommodated in the fermentation case 160. The insulation portion may be disposed between the fermenter 112 and the fermentation case 160 to insulate the fermenter 112. The evaporator 134 (see FIG. 1) and the heater 14 (see FIG. 1) may be disposed between the insulation portion and the fermenter 112. That is, the insulation portion may surround the evaporator 134 and/or the heater 14 together with the fermenter 112. Thus, the temperature of the fermenter 112 may be easily controlled.

The fermentation lid 107 may be disposed above the fermenter module 111 to open and close the fermenter module 111 at an upper side. Lid seating body 179 may be disposed above the fermentation case 160 to support the fermentation lid 107 at a lower side.

The fermentation case 160 may be placed on the fermentation module support 109 of the base 100. The fermentation lid 107 may be separably connected to the fermenter module 111, slidably connected to the fermenter module 111, or rotatably connected to the fermenter module 111. For example, the fermentation lid 107 may be hinge-coupled to the fermenter module 111.

A first hinge connection portion 107a that protrudes backward may be provided on the fermentation lid 107. The first hinge connection portion 107a may be hinge-coupled to the fermentation module 179.

The refrigeration cycle device 13 may include a compressor 131, a condenser 132, and the evaporator 134 (see of FIG. 1). The beverage maker may further include a blower fan 135 that cools the condenser 132.

The refrigeration cycle device 13 may include a heat pump. The refrigeration cycle device 13 may include a refrigerant channel switching valve (not shown). The refrigerant channel switching valve may include a four-way valve. The refrigerant channel switching valve may be connected to each of a suction channel of the compressor 131 and a discharge channel of the compressor 131, may be connected to the condenser 132 through a condenser connection channel, and may be connected to the evaporator 134 through an evaporator connection channel.

When the fermenter 112 is cooled, the refrigerant channel switching valve may guide refrigerant compressed in the compressor 131 to the condenser 132 and guide refrigerant discharged from the evaporator 134 to the compressor 131. When the fermenter 112 is heated, the refrigerant channel switching valve may guide refrigerant compressed in the compressor 131 to the evaporator 134 and guide refrigerant discharged from the condenser 132 to the compressor 131.

The base 100 may support at least a portion of the refrigeration cycle device 13. For example, the compressor 131 of the refrigeration cycle device 13 may be supported by the base 100.

A refrigerant pipe (not shown) may be connected to the fermentation module 1. The refrigerant pipe may be provided in the refrigeration cycle device 13 (see FIG. 1). The refrigerant pipe may connect the condenser 132 to the evaporator 134 (see FIG. 1). An expansion mechanism (not shown) may be installed in the refrigerant pipe.

The refrigerant pipe may pass between a first coupling body 231 and the base 100 of a main frame 230 described hereinafter.

A tank case 149 in which the tank 51 (see FIG. 1) may be accommodated may be disposed above the base 100. The tank case 149 may be a circular hollow cylinder with an open top surface. The user may insert the tank 51 into the tank case 149 or take the tank 51 out of the tank case 149. A bottom surface of the tank case 149 may be spaced apart from a top surface of the base 100 in a vertical direction.

A support body 102 that supports the tank case 149 may be disposed on the base 100, and a first support portion or support 511 supported to contact the support body 102 may be disposed on the tank case 149.

The support body 102 may protrude upward from the base 100, and the first support 511 may protrude downward from the tank case 149. As the support body 102 and the first support 511 extend lengthwise vertically, a bottom surface of the tank case 149 may be spaced apart from the base 100.

A heater case 113 in which the heater 53 (see FIG. 1) may be accommodated may be installed on the base 100, and a second support portion or support 514 supported by the heater case 113 may be installed on the tank case 149.

The heater case 113 may extend lengthwise vertically, and the bottom surface of the tank case 149 may be spaced apart from the base 100. That is, one or a first side of the tank 51 may be supported by the support body 102 disposed on the base 100, and the other or a second side may be supported by the heater case 113.

A machine room 148 may be defined between the tank case 149 and the base 100. The machine room 148 may refer to a space between the tank case 149 and the base 100. Components, such as the pump 52, the air injection pump 82, and the compressor 131 may be disposed in the machine room 148.

The tank case 149 may be horizontally spaced apart from the fermentation module 1. That is, the tank case 149 and the fermentation module 1 may be horizontally spaced apart from each other.

The beverage maker may further include a tank lid 110 that covers an open top surface of the tank 51 (see FIG. 1). The tank 51 may have a hollow cylindrical shape with the open top surface, and the tank lid 110 may open and close the open top surface of the tank 51. The tank lid 110 may be detachably mounted on the tank 51 or may be hinged to the tank 51.

The tank lid 110 may have a shape that is the same as or similar to the fermentation lid 107. Thereby, the beverage maker may have a sense of unity by design.

A height from the base 100 to the fermentation lid 107 may be equal to a height from the base 100 to the tank lid 110. A top surface of the base 100 to the fermentation lid 107 may be the same height as the top surface from the base 100 to the tank lid 110.

The beverage maker may include covers 201, 202, 210, and 220 defining an outer appearance of the beverage maker. The covers 201, 202, 210, and 220 may be placed on the base 100.

The covers 201, 202, 210, and 220 may be integrated with each other; however, embodiments are not limited thereto. For example, a plurality of members or components may be coupled to each other in terms of manufacturing and maintenance.

The covers 201, 202, 210, and 220 may include a fermentation module cover 201, a tank case cover 202, a front cover 210, and a rear cover 220. Each of the fermentation module cover 201 and the tank case cover 202 may have a hollow shape. A portion of a circumferential surface of each of the fermentation module cover 201 and the tank case cover 202 may be open. The open portion of the circumferential surface may be disposed inside of the beverage maker and may not be exposed to the outside, and thus, the beverage maker may be improved in design.

The fermentation module cover 201 and the tank case cover 202 may surround at least portions of outer circumferences of the fermentation module 1 and the tank case 149, respectively. The fermentation module cover 201 and the tank cover 51 may protect the fermentation module 1 and the tank case 149 against an external impact.

The fermentation module cover 201 and the tank case cover 202 may be horizontally spaced apart from each other. The fermentation module cover 201 and the tank case cover 202 may have a same height and/or diameter. Thus, the beverage maker may be improved in design due to symmetric structure and unity of the outer appearance thereof.

A top surface of the fermentation module cover 201 may be open, and the fermentation lid 109 may be exposed upward. Also, a top surface of the tank case cover 202 may be open, and the tank lid 110 may be exposed upward. The user may easily open and close the fermentation lid 107 and the tank lid 110.

The front cover 210 may define an outer appearance of a front side of the beverage maker. The front cover 210 may cover a portion between the fermentation module cover 201 and the tank case cover 202 at the front side.

The front cover 210 may be disposed between the front fermentation module cover 201 and the tank case cover 202. The front cover 210 may have ends respectively contacting the fermentation module cover 201 and the tank case cover 202.

The front cover 210 may have a flat plate shape that is vertically disposed. The front cover 210 may have a same height as each of the fermentation module cover 201 and the tank case cover 202.

The dispenser 62 may be mounted on the front cover 210. The dispenser 62 may be disposed closer to an upper end of the front cover 210 than a lower end of the front cover 210. The dispenser 62 may be disposed above the residual fluid tray 101. The user may manipulate the lever 620 of the dispenser 62 to dispense the beverage.

A dispenser mounting portion or mount 214 on which the dispenser 62 may be mounted may be disposed on the front cover 210. The dispenser mount 214 may be disposed closer to the upper end of the front cover 210 than the lower end of the front cover 210.

The beverage maker may include a display (not shown) that displays various pieces of information of the beverage maker. The display 282 may be disposed on the front cover 210.

The display 282 may be disposed at a portion of the front cover 210, which is not covered by the dispenser 62. That is, the display 282 may not overlap the dispenser 62 in a horizontal direction.

The display may include at least one display element of a liquid crystal display (LCD), a light emitting diode (LED), or organic light emitting diode (OLED), and a display printed circuit board (PCB) on which a display element is installed. The display PCB may be mounted on a rear surface of the front cover 210 and electrically connected to a controller 284 described hereinafter.

The beverage maker may include an input that receives a command related to the making of a beverage by the beverage maker. The input may include at least one of a touch screen that receives a user's command in a touch member, a rotary knob held by the user to rotate, and/or a button pushed by the user. For example, the input may include a rotary knob 283. The rotary knob 283 may be disposed on the front cover 210. The rotary knob 283 may be disposed below the display.

The rotary knob 283 may function as a button that is pushed by the user. That is, the user may hold the rotary knob 283 so that the rotary knob 283 rotates, or the user may input a control command by pushing a front surface of the rotary knob 283.

Also, the input may include a touch screen that receives a user's command in a touch manner. The touch screen may be provided on the display, and the display may function as the touch screen. The input may be electrically connected to the controller 284 described hereinafter.

The beverage maker may further include a wireless communication module (not shown). However, embodiments are not limited to kinds of wireless communication modules. For example, the wireless communication module may include a Bluetooth module or a Wi-Fi module.

The wireless communication module may be disposed on a rear surface of the front cover 210. The wireless communication module may be electrically connected to the controller 284 described hereinafter. The beverage maker may wirelessly communicate with a separate mobile terminal, for example. The user may input a command, inquire about beverage making information, or monitor a making process in real time using the mobile terminal.

The front cover 220 may define an outer appearance of a front side of the beverage maker. The rear cover 220 may cover a portion between the fermentation module cover 201 and the tank case cover 202 at a rear side.

The ingredient supplier 3 may be disposed between the fermentation module 1 and the tank 51. That is, the ingredient supplier 3 may be disposed between the fermentation module 1 and the tank case 149. The beverage maker may be compact, and the ingredient supplier 3 may be protected by the fermentation module 1 and the tank case 149.

At least a portion of each of both side surfaces of the ingredient supplier 3 may be curved. The curved surfaces may contact each of an outer circumference of the fermentation module cover 201 and an outer circumference of the tank case cover 202.

The ingredient supplier 3 may be disposed above the base 100 so as to be vertically spaced apart from the base 100. The ingredient supplier 3 may be disposed above the main frame 230.

The ingredient supplier 3 may be disposed between the front cover 210 and the rear cover 220 in frontward and rearward directions. A front surface of the ingredient supplier 3 may be covered by the front cover 210, and a rear surface of the ingredient supplier 3 may be covered by the rear cover 220.

The ingredient supplier 3 may be installed at an approximately central upper portion of the beverage maker. The user may open the ingredient supplier 3 to easily mount or separate ingredient containers C1, C2, and C3.

The beverage maker may include the main frame 230. At least a portion of the plurality of valves of FIG. 1 may be mounted on the main frame 230. That is, a plurality of valve mounting portions or mounts to which the plurality of valves may be mounted may be disposed on the main frame 230. The plurality of valves may include flow rate control valve 54, ingredient supply valve 310, main valve 40, bypass valve 35, exhaust valve 156, beverage dispensing valve 64, sub valve 92, gas discharge valve 73, and pressure release valve 76, for example.

The main frame 230 may be coupled to the fermentation module 1 and the tank case 149, respectively. The main frame 230 may be spaced apart from the base 100 in the vertical direction.

The main frame 230 may be coupled from the rear side of the tank case 149 and the fermentation module 1, and the plurality of valve mounts may be disposed on a rear surface of the main frame 230. Thus, when only the rear cover 220 is removed in the beverage maker, the user may directly access the plurality of valves, and thus, maintenance and repair of the valves may be facilitated.

At least a portion of the main frame 230 may be disposed between the fermentation module 1 and the tank 51. At least a portion of the main frame 230 may be disposed below the ingredient supplier 3.

The main frame 230 may include first coupling body 231 coupled to the fermentation module 1, a second coupling body 232 coupled to the tank case 149, and a connection body that connects the first coupling body 231 to the second coupling body 232 and at least a portion of which is disposed between the fermentation module 1 and the tank 51. The connection body 233 may be disposed below the ingredient supplier 3. At least a portion of the second coupling body 232 may be disposed between a control module 280 and the tank case 149 in the frontward and rearward direction.

A number of valve mounting portions or mounts disposed on the first coupling body 231 may be greater than a number of valve mounting portions or mounts disposed on the second coupling body 232. This is done because a number of channels connected to the fermentation module 1 may be greater than a number of channels connected to the tank 51, and a number of valves that restricts a flow of fluid introduced into and discharged from the fermentation module 1 may be greater than a number of valves that restricts a flow of fluid discharged from the tank 51.

The beverage maker may include the control module 280. The control module 280 may be an electric component of the beverage maker. The control module 280 may be mounted on the main frame 230 or the tank case 149.

The control module 280 may be disposed behind the tank case 149. The control module 280 may be disposed behind the second coupling body 232.

This is done because a number of valves disposed at the rear side of the fermentation module 1 is greater than a number of valves disposed at the rear side of the tank case 149. Thus, a space within the beverage maker may be used efficiently, and the beverage maker may be compact. The control module 280 may extend lengthwise vertically.

A control module coupling portion 103 that protrudes upward may be disposed on the base 100, and the control module 280 may be coupled to and supported by the control module coupling portion 103. The control module 280 may be coupled to the second coupling body 232 of the tank case 149 and/or the main frame 230.

The control module 280 may include a main PCB and a PCB case 281 in which the main PCB may be built. The main PCB may include controller 284 that substantially controls an operation of each of the components of the beverage maker. The PCB case 281 may be coupled to the main frame 230 and/or the tank case 149 to safely protect the main PCB therein.

The controller 284 provided in the control module 280 may be electrically connected to the wireless communication module. For example, the controller 284 may receive a command received through the wireless communication module, and thus, the beverage may be made. Also, the controller 284 may transmit information related to the beverage maker or the beverage to be made from the wireless communication module to a separate mobile terminal.

The controller 284 may receive the command input into the input. For example, the controller 284 may make a beverage according to a command input by the rotary knob 283. Also, the controller 284 may control the display 282 to output various pieces of information of the beverage maker. For example, the controller 284 may display an amount of dispensed beverage, and an amount of residual beverage, information related to completion of dispensing of the beverage, for example, through the display 282.

The controller 284 may control at least one of the pump 52, the heater 53, the air injection pump 82, the air supply pump 151, or the temperature controller 11. Also, the controller 284 may control at least one of the flow rate control valve 54, the ingredient supply valve 310, the main valve 40, the bypass valve 35, the exhaust valve 156, the beverage dispensing valve 64, the sub valve 92, the gas discharge valve 73, or the pressure release valve 76.

The controller 284 may receive a measured value of at least one of the flow meter 56, the thermistor 54a, the fluid supply temperature sensor 57, the temperature sensor 16, or the gas pressure sensor 72. The controller 284 may detect an inner pressure of the fermentation container 12 by the gas pressure sensor 72 and detect a temperature of the fermenter 112 by the temperature sensor 16. The control module 280 may determine a degree of fermentation of the beverage using the detected pressure or temperature.

The controller 284 may detect a temperature of fluid supplied from the fluid supply module 5 to the first main channel 41 using the fluid supply temperature sensor 57. The controller 284 may control the heater 53 according to the detected temperature of the fluid. The controller 284 may control the temperature controller 11 to maintain the temperature of the fermenter 112 at an adequate temperature.

The controller 284 may accumulate at least one of a time taken to open the dispenser 62, a time taken to drive the air supply pump 151, and a time taken to turn on the main valve 40 after the beverage is completely made, for example. The controller 284 may calculate an amount of dispensed beverage dispensed from the fermentation container 12 according to the accumulated time. The controller 284 may calculate an amount of residual beverage from the calculated amount of dispensed beverage. The controller 284 may determine whether the beverage within the fermentation container 12 is completely dispensed from the calculated amount of residual beverage. The controller 284 may determine that the beverage is completely dispensed when it is determined that the beverage within the fermentation container 12 is completely dispensed. In addition, the controller 284 may control an overall operation of the beverage maker.

The beverage maker may further include a condenser case 130. The condenser case 130 may be disposed on the base 100 and may accommodate the condenser 132.

The condenser case 130 may be disposed to face in an oblique direction with respect to the frontward and rearward direction or lateral directions. The compressor 131, the blower fan 135, and the condenser 132 may be disposed in a straight line, and the condenser case 130 may extend lengthwise in a direction parallel to the straight line.

The blower fan 135 may be disposed between the compressor 131 and the condenser 132. The blower fan 135 may blow air into the condenser case 130. The air suctioned from a suction port 251 defined in the base 100 may be blown into the condenser case 130 by the blower fan 135 and then may be discharged to a discharge port defined in the rear cover 220 after being heat-exchanged with the condenser 132.

The blower fan 135 may be coupled to the condenser case 130. As the air blown by the blower fan 135 by the condenser case 130 passes through the condenser 132 completely, heat-exchange efficiency of the condenser 132 may be improved. Also, the condenser case 130 may prevent heat of the condenser 132 from be spread therearound.

The blower fan 135 may be disposed between the compressor 131 and the condenser 132. Thus, the air blown by the blower fan 135 may dissipate at the compressor 131.

An extension portion 130a that extends in a longitudinal direction of the condenser case 130 to guide the air passing through the condenser 132 to a discharge port 271 of the rear cover 220 may be disposed on a top surface of the condenser case 130. The extension portion 130a may serve as an air guide. A reinforcing rib that extends to a top surface of the extension portion 130a may be disposed on the top surface of the condenser case 130.

A condensed fluid accommodation portion 104 may be provided in the base 100. The condensed fluid accommodation portion 104 may be a space in which a gas is discharged from the gas discharge valve 73, and condensed fluid generated therein may be accommodated.

In the process of discharging a gas by the gas discharge valve 73 mounted on the main frame 230, the gas may meet external cold air to generate condensed fluid, and the condensed fluid may drop into the condensed fluid accommodation portion 104 so as to be collected in the condensed fluid accommodation portion 104. The condensed fluid accommodation portion 104 may be disposed behind the fermentation module support 109.

A protrusion portion or protrusion 106 that protrudes upward from the top surface of the base 100 to prevent the condensed fluid from flowing outside of the condensed fluid accommodation portion 104 may be disposed on the base 100. The condensed fluid accommodation portion 104 may communicate with a space defined between the fermentation module 1 and the fermentation module support 109. A communication groove 105 that allows the condensed fluid accommodation portion 104 to communicate with the space may be defined in the base 100.

The condensed fluid accommodated in the condensed fluid accommodation portion 104 may flow into the space between the fermentation module 1 and the fermentation module support 109 so that more condensed fluid may be accommodated. The condensed fluid accommodation portion 104 and the condensed fluid accommodated in the auxiliary space may be naturally evaporated.

Figure 7:
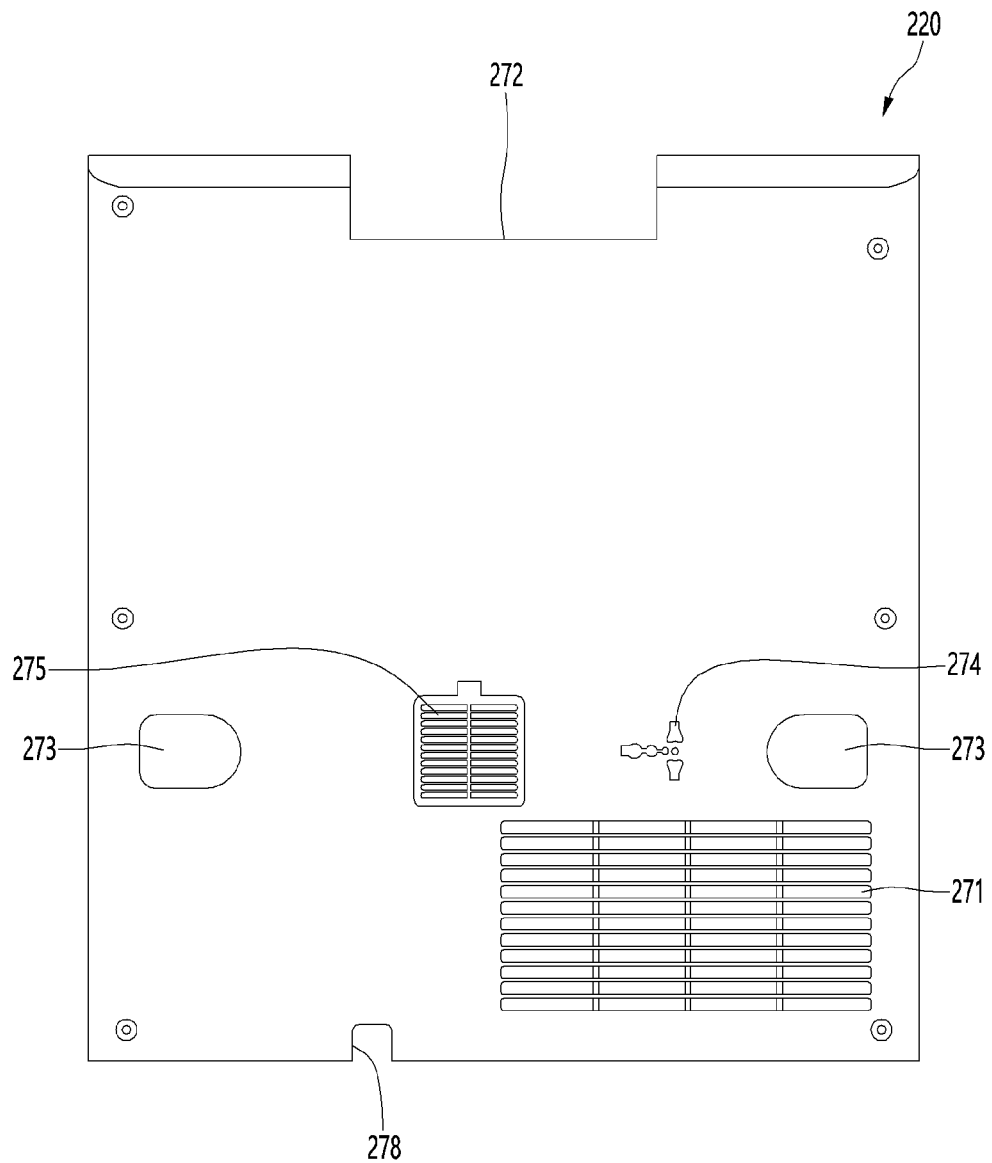
FIG. 7 is a rear view of a rear cover according to an embodiment.
Figure 8:
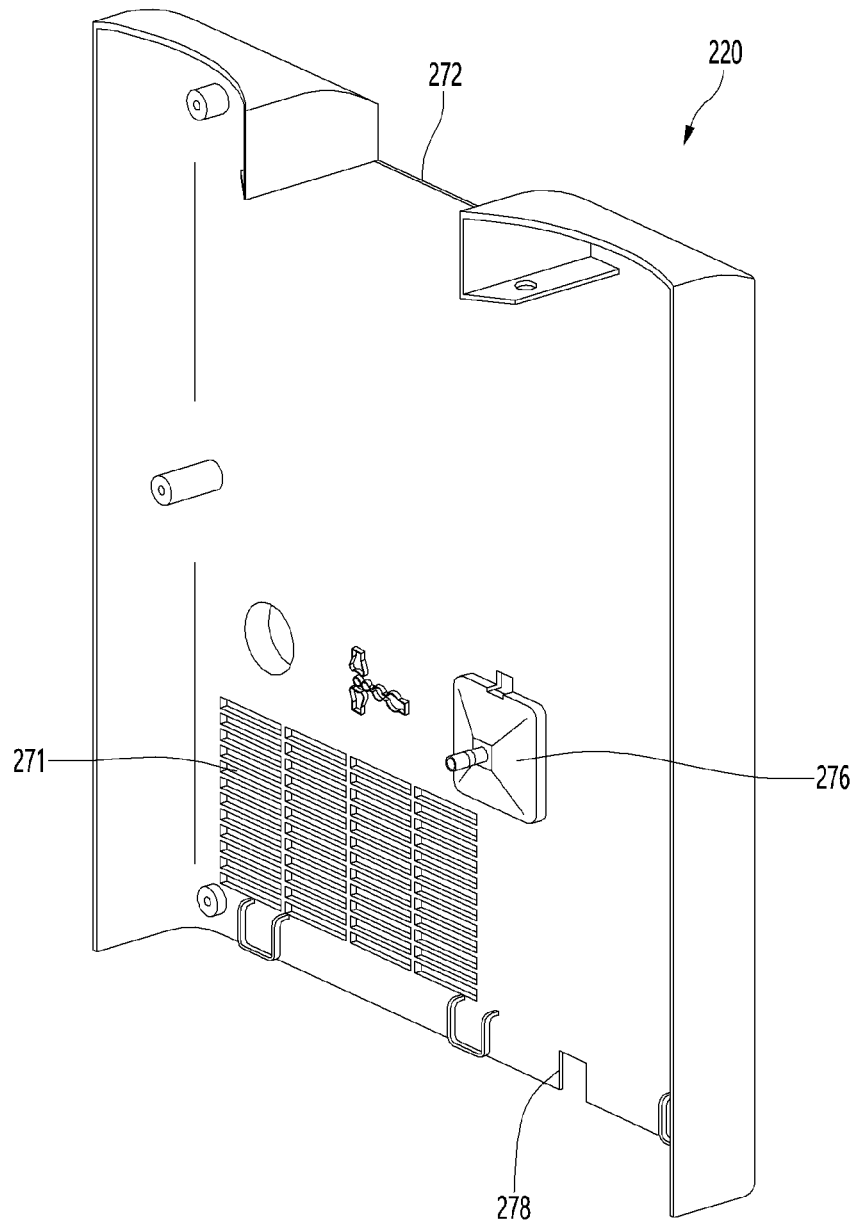
FIG. 8 is a perspective view of the rear cover of FIG. 7.

FIG. 7 is a rear view of a rear cover according to an embodiment. FIG. 8 is a perspective view of the rear cover of FIG. 7.

The rear cover 220 may be disposed behind the fermentation module 1, and a plurality of discharge ports 271 may be provided in the rear cover 220. The condenser case 130 (see FIG. 6) may be disposed to face the plurality of discharge ports 271 of the rear cover 220. The air blown into the condenser case 130 by the blower fan 135 may be heat-exchanged with the condenser 132 and discharged through the plurality of discharge ports 271.

The plurality of discharge ports 271 defined in the rear cover 220 may be disposed at a position closer to one or a first end than the other or a second end of the rear cover 220. The plurality of discharge ports 271 may be disposed at a position closer to a right end or first side than a left end or second side of the rear cover 220.

Referring to FIGS. 6 and 7, the plurality of discharge ports 271 may overlap with the blower fan 135 in a longitudinal direction of the condenser case 130. The condenser case 130 may extend in an oblique direction to face the plurality of discharge ports 271. Therefore, air discharged to the outside of the beverage maker may be prevented from being introduced into the beverage maker through the open discharge ports 271 to improve heat dissipation efficiency.

A through-groove 278 through which a power cord, for example, an electric wire, that supplies power to the beverage maker may pass, may be defined in the rear cover 220. A power cord fixing portion 273, on which the power cord may be wound, and a plug hole 274, into which a plug connected to an end of the power cord may be inserted, may be provided in/on the rear cover 220. The power cord fixing portion 273 may be provided on a rear surface of the rear cover 220 and may be provided in a pair at left and right or lateral sides. The plug hole 274 may be defined between both power cord fixing portions 273.

Power cords may be alternately wound and fixed to both power cord fixing portions 273, and plugs connected to the power cords may be inserted into the plug holes 274. As a result, the power cords and the plugs may be arranged by the power cord fixing portions 273 and the plug holes 274 when the beverage maker is not in use, and also, discomfort when transporting the product may be solved.

An avoidance portion 272 that prevents interference with the ingredient supplier 3 may be provided at an upper end of the rear cover 220. The avoidance portion 272 may be formed by cutting a portion of the upper end of the rear cover 220. A rear end of the ingredient supplier 3 may be disposed in the avoidance portion 272, and the beverage maker may be compact when compared to a case in which the avoidance portion 272 is not provided.

An air filter mounting portion or mount 276 on which the air filter 150 (see FIG. 1) may be mounted may be disposed on the rear cover 220. The air filter 150 may filter air suctioned into each suction portion of the air injection pump 82 and the air supply pump 151.

The air filter mount 276 may be recessed backward from the rear cover 220. A channel connection portion may be disposed on the air filter mount 276, and the air suction channel 152 may be connected to the channel connection portion.

A filter mounting portion cover 275 may be detachably provided on the air filter mount 276. The filter mounting portion cover 275 may cover the air filter mount 276 at the rear side of the rear cover 220. The filter mounting portion cover 275 may have a plurality of through-holes through which air may pass. The user may easily replace the air filter 150 by removing the filter mounting portion cover 275 from the air filter mount 276.

Figure 9:
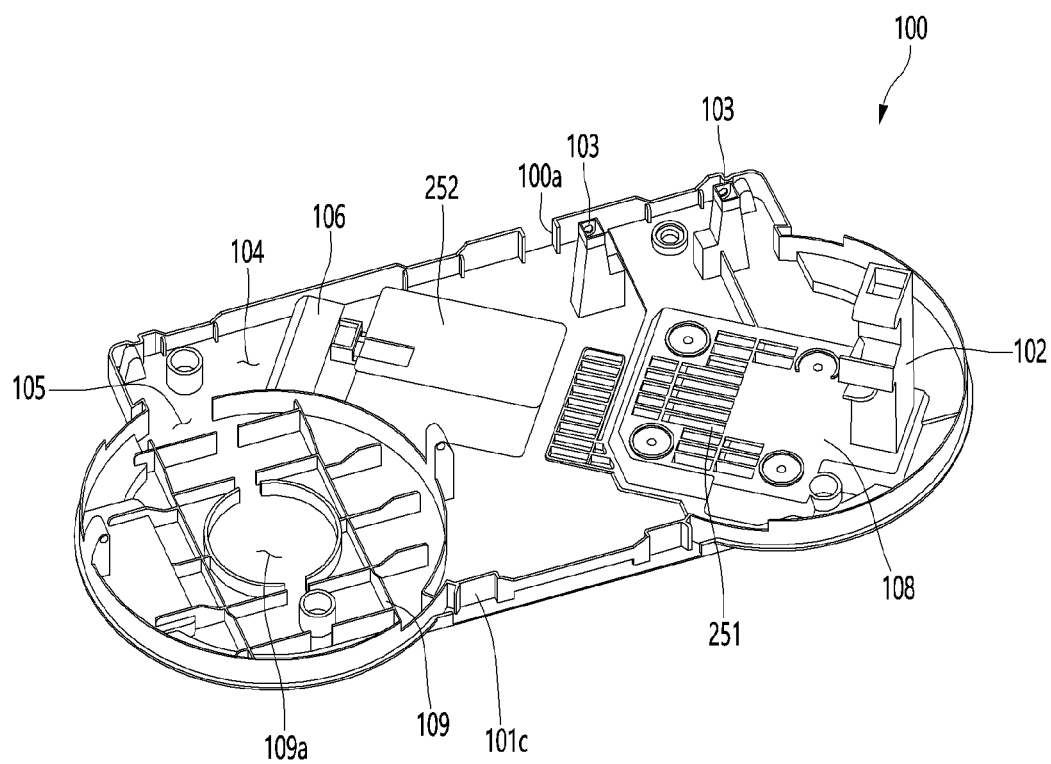
FIG. 9 is a perspective view of a base according to an embodiment.
Figure 10:
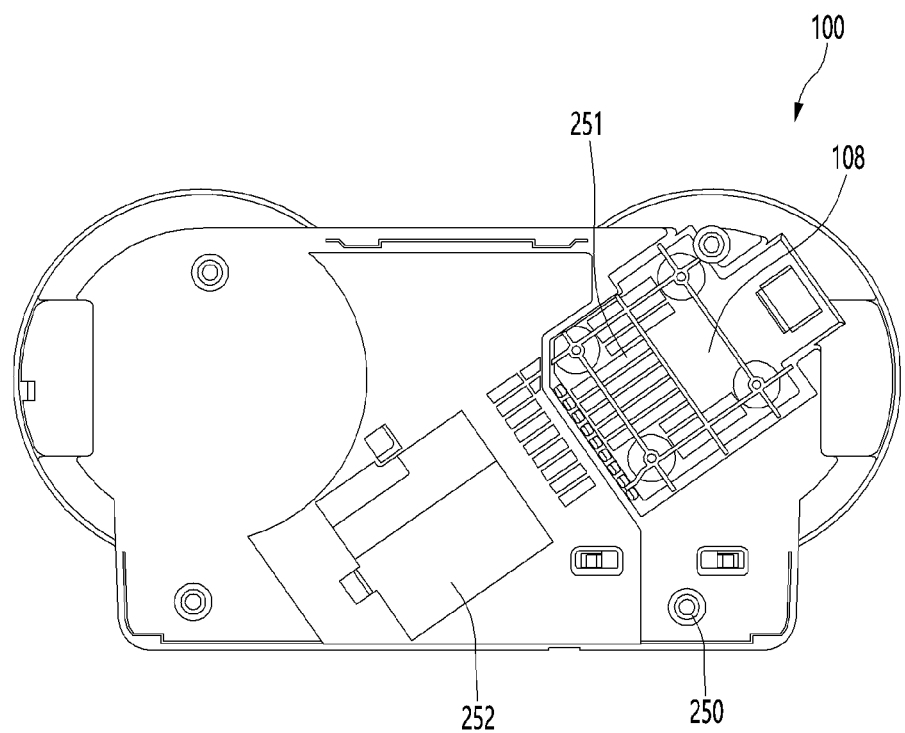
FIG. 10 is a bottom view of the base of FIG. 9.

FIG. 9 is a perspective view of a base according to an embodiment. FIG. 10 is a bottom view of the base of FIG. 9.

The base 100 may include the fermentation module support 109, the condensed fluid accommodation portion 104, a compressor support portion or support 108, and a condenser case support portion or support 252. The fermentation module support 109 may support the fermentation module 1. The fermentation module support 109 may be disposed at a position closer to a front end than a rear end of the base 100.

When the fermentation module 1 is placed on the fermentation module support 109, an auxiliary space 109a may be defined between the fermentation module 1 and the fermentation module support 109. The fermentation module support 109 may include a plurality of support frames that protrudes upward. The fermentation module 1 may be supported to contact the support frame, and the auxiliary space 109a may be defined between a bottom surface of the fermentation module 1 and the fermentation module support 109.

The condensed fluid accommodation portion 104 may accommodate the condensed fluid generated by gas or air discharged from the fermentation module 1. The condensed fluid accommodation portion 104 may be disposed behind the fermentation module support 109.

The communication groove 105 which allows the condensed fluid accommodation portion 104 to communicate with the fermentation module support 109 may be defined in the base 100. The condensed fluid of the condensed fluid accommodation portion 104 may flow into the auxiliary space 109a defined in the fermentation module support 109 by the communication groove 105, and also, more condensed fluid may be accommodated and may be widely spread so that an evaporation rate of the condensed fluid may increase.

The protrusion 106 that prevents the condensed fluid from flowing outside of the condensed fluid accommodation portion 104 may be disposed on the base 100. The protrusion 106 may protrude upward from the top surface of the base 100. The protrusion 106 may be disposed between the condensed fluid accommodation portion 104 and the condenser case support 252. The protrusion 106 may prevent the condensed fluid of the condensed fluid accommodation portion 104 from flowing outside of the auxiliary space 109a.

The compressor support 108 may support the compressor 131 of the refrigeration cycle device 13. The compressor support 108 may be disposed at a position at which the compressor 131 is disposed under the tank case 149. The condenser case support 252 may support the condenser case 130.

The condenser case support 252 may be disposed so that the condenser case 130 is disposed obliquely. The condenser case support 252 may be disposed at a position closer to the rear end than the front end of the base 100.

The suction port 251 through which air may be suctioned may be provided in the base 100. The suction port 251 may be a plurality of holes that penetrate vertically. The air suctioned through the suction port 251 may be blown to the condenser 132 within the condenser case 130 by the blower fan 135. At least a portion of the suction port 251 may be disposed between the condenser case support 252 and the compressor support 108.

A residual fluid tray coupling portion 101c to which the residual fluid tray 101 (see FIG. 2) may be coupled may be disposed on the front end of the base 100. The support body 102 that supports the tank case 149 may be disposed on the base 100. The support body 102 may protrude upward from the base 100, and more specifically, may protrude upward from a top surface of the compressor support 108.

The support body 102 may be connected to the first support 511 disposed on the tank case 149 to support one side of the tank 51. The support body 102 may allow the bottom surface of the tank case 149 to be spaced apart from the compressor support 108 to provide a length so that the compressor 131, the pump 52, the air injection pump 82, and the air supply pump 151 may be disposed therebetween.

The control module coupling portion 103 which may be coupled to the control module 280 (see FIG. 5) may be disposed on the base 100. The control module coupling portion 103 may protrude upward from the base 100. A plurality of the control module coupling portion 103 may be provided and may be disposed behind the compressor support 108. A height of the control module coupling portion 103 may be less than a height of the support body 102.

A through-groove 100a through which a power cord, for example, an electric wire, to supply power to the beverage maker may pass, may be defined in the base 100. The through-groove 100a may be defined in the rear end of the base 100. The through-groove 100a defined in the base 100 may be defined under the through-groove 278 (see FIG. 7) defined in the rear cover 220. The through-groove 100a defined in the base 100 and the through-groove 278 defined in the rear cover 220 may together form a power cord through-hole.

A plurality of legs 250 that protrudes downward may be provided on the base 100. For example, four legs 250 may be provided on the base 100.

Each of the plurality of legs 250 may have a length such that the base 100 is maintained horizontally. A bottom surface of the base 100 may be spaced vertically from an installation surface, on which the beverage maker is installed, by the plurality of legs 250. Thus, external air may flow between the base 100 and the installation surface and be easily suctioned into the suction port 251.

Figure 11:
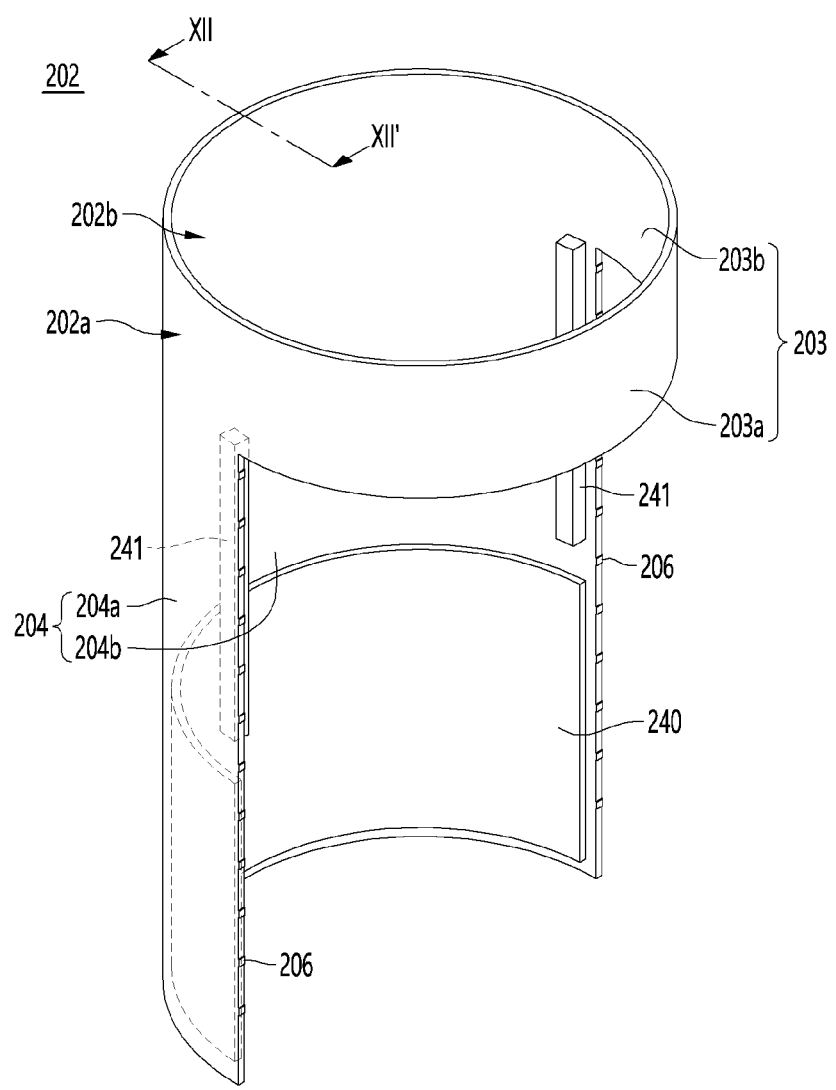
FIG. 11 is a perspective view of a tank case cover according to an embodiment.
Figure 12:
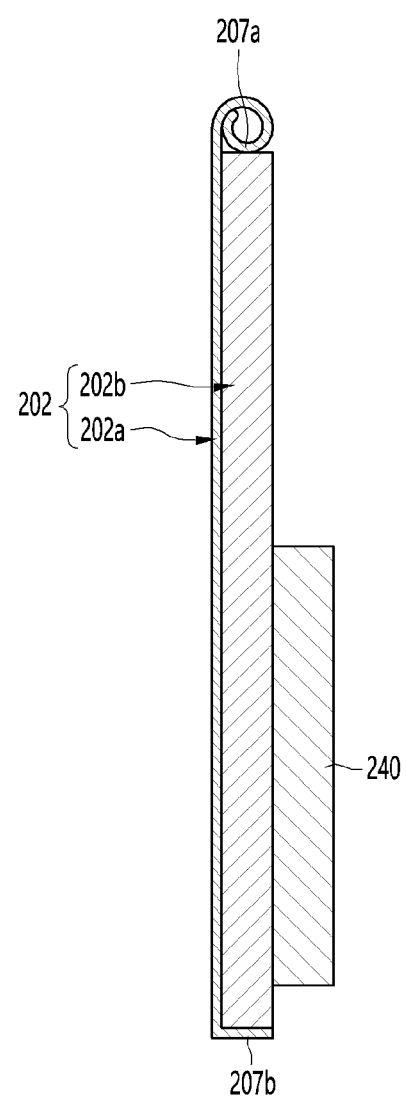
FIG. 12 is a cross-sectional view, taken along line XII-XII' of FIG. 11.
Figure 13:
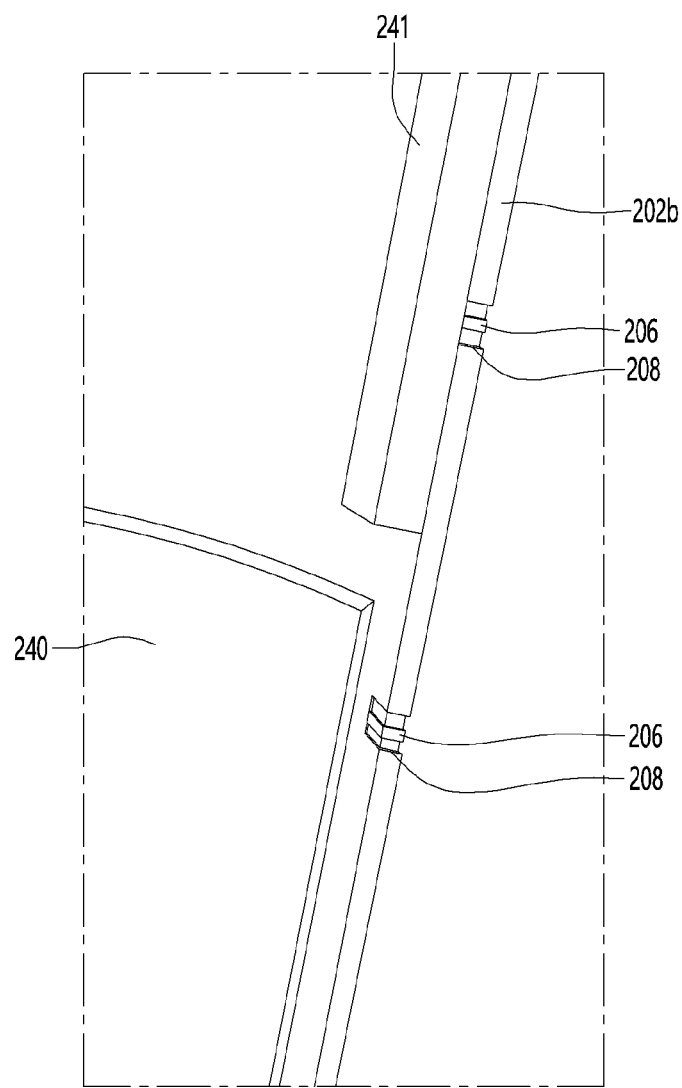
FIG. 13 is an enlarged view illustrating a surrounding area of a hook of the tank case cover according to an embodiment.

FIG. 11 is a perspective view of a tank case cover according to an embodiment. FIG. 12 is a cross-sectional view, taken along line XII-XII' of FIG. 11. FIG. 13 is an enlarged view illustrating a surrounding area of a hook of the tank case cover according to an embodiment.

The tank case cover 202 may cover the machine room 148 (see FIG. 3) and the tank case 149 at one side. The tank case cover 202 may include an outer cover 202a and an inner cover 202b, which may be coupled inside of the outer cover 202a. The outer cover 202a and the inner cover 202b may have a shape equal or similar to each other.

Each of the outer cover 202a and the inner cover 202b may be integrally provided. The outer cover 202a may be made of a metal material, and the inner cover 202b may be made of a non-metal material. The outer cover 202a may be made of steel, and the inner cover 202b may be made of injection plastic.

As the outer cover 202a defining a portion of the outer appearance of the beverage maker is made of the metal material, the appearance of the beverage maker may be luxurious in design. As the inner cover 202b is made of the non-metal material, a load of the tank case cover 202 may be prevented from being excessively heavy to facilitate attachment of a sound absorption pad 240 and a sound absorption member 241, which will be described hereinafter. As the tank case cover 202 includes the outer cover 202a and the inner cover 202b which are coupled to each other, the tank case cover 202 may have a higher noise reduction effect than a case in which the tank case cover 202 is provided as an integrated cover having a same thickness.

An upper processed portion 207a at which an upper end of the outer cover 202a is curled or bent inward may be disposed on the upper end of the outer cover 202a. A lower processed portion 207b at which a lower end of the outer cover 202a is curled or bent inward may be disposed on the lower end of the outer cover 202a. As the upper and lower ends of the outer cover 202a are not sharply formed by the upper processed portion 207a and the lower processed portion 207b, the user may be prevented from being injured.

The upper processed portion 207a may be a curled portion at which the upper end of the outer cover 202a is curled inward, and the lower processed portion 207b may be a bent portion at which the lower end of the outer cover 202a is bent inward. Thus, an upper end of the upper processed portion 207a shown to the user may be improved in design.

The inner cover 202b may be disposed between the upper processed portion 207a and the lower processed portion 207b in the vertical direction. The inner cover 202b may be coupled to the outer cover 202a in the vertical direction.

The tank case cover 202 may include a ring-shaped fixing portion 203, and a cover portion 204 connected to a portion of a lower end of the fixing portion 203. The fixing portion 203 may include an outer fixing portion 203a provided on the outer cover 202a and an inner fixing portion 203b provided on the inner cover 202b.

The cover portion 204 may include an outer cover portion 203a provided on the outer cover 202a and an inner cover portion 203b provided on the inner cover 202b. The inner fixing portion 203b may be disposed inside of the outer fixing portion 203a, and the inner cover portion 204b may be disposed inside of the outer cover portion 204a.

An upper circumference of the tank case 149 of the fixing portion 203 may be surrounded. The fixing portion 203 may fix the tank case cover 202 to the tank case 149 in the horizontal direction.

The cover portion 204 may be disposed to be elongated downward from a lower portion of the fixing portion 203. A cross section of the cover portion 204, which is cut horizontally, may have arc shape. Both ends of the cover portion 204 may be extend lengthwise vertically. A lower end of the fixing portion 203 may connect both ends of the cover portion 204 to each other.

A portion of the upper portion of the cover portion 204 may face the outer surface of the tank case 149 in the horizontal direction, and a portion of the lower portion may face the machine room 148. A portion, which connects both ends of the cover portion 204 to each other, in both ends of the cover portion 204 and the lower end of the fixing portion 203 may define an opening together. The opening may be defined between the front cover 210 (see FIG. 2) and the rear cover 220 and may not be visible from outside of the beverage maker.

A plurality of hooks 206 that couples the inner cover 202b may be disposed on both ends of the outer cover portion 203a. A plurality of the hooks 206 spaced apart at regular intervals from each other along both ends of the outer cover portion 203a may be provided. The plurality of hooks 206 may be integrated with the outer cover 202a.

The plurality of hooks 206 may be hooked with a plurality of hook catching portions 208 disposed on both ends of the inner cover portion 203b, respectively. The plurality of the hook catching portions 208 may be spaced at regular intervals from each other along both ends of the inner cover portion 203b.

The plurality of hook catching portion 208 may be stepped with respect to the end of the inner cover portion 203b. Accordingly, the hook 206 may be firmly caught with the hook catching portion 208.

The machine room 148 (see FIG. 3) may be defined between the tank case 149 and the base 100, and a noise source that generates driving noise may be disposed in the machine room 148. The noise source may be at least one of the pump 52, the air injection pump 82, the air supply pump 151, or the compressor 131.

The tank case cover 202 may be provided with sound absorption pad 240 and sound absorption member 241 to minimize transmission of noise generated from the noise source to the user. The sound absorption pad 240 may be attached to an inner surface of the tank case cover 202. The sound absorption pad 240 may be attached to a lower portion of the inner surface of the tank case cover 202. The sound absorption pad 240 may be attached to a lower portion of an inner surface of the inner cover 202b.

The sound absorption pad 240 may face the machine room 148 in the horizontal direction. The sound absorption pad 240 may be disposed in the machine room 148. The sound absorption pad 240 may overlap a gap defined between the inner surface of the tank case cover 202 and the outer surface of the tank case 149 in the vertical direction. Accordingly, the tank case cover 202 may be compact.

The sound absorption pad 240 may be a soft pad and may be attached in a state of being bent along the inner surface of the tank case cover 202. The suction pad 240 may be attached by being bent in a circumferential direction of the tank case cover 202.

The sound absorption member 241 may be attached to the inner surface of the tank case cover 202. The sound absorption member 241 may be attached to the inner surface of the inner cover 202b.

The sound absorption member 241 may be compressed between the inner surface of the tank case cover 202 and the outer surface of the tank case 149 (see FIG. 3). That is, the sound absorption member 241 may be disposed in a gap between the inner surface of the tank case cover 202 and the outer surface of the tank case 149 to minimize leakage of noise through the gap.

The sound absorption member 241 may be made of an elastic material. The sound absorption member 241 may be pressed and compressed between the tank case cover 202 and the tank case 149. The sound absorption member 241 may be made of polyethylene foam (PE foam); however, embodiments are not limited thereto.

A plurality of the sound absorption member 241 may be provided. For example, a pair of sound absorption members 241 may be disposed at both ends of the cover portion 204, respectively.

The sound absorption member 241 may extend lengthwise vertically. The sound absorption member 241 may extend lengthwise vertically along both ends of the cover portion 204. An upper end of the sound absorption member 241 may be disposed on a horizontal surface with the lower end of the fixing portion 203 or may be adjacent to the horizontal surface.

The sound absorption member 241 may be disposed above the sound absorption pad 240. A height from the lower end of the tank case cover 202 to a lower end of the sound absorption member 240 may be higher than a height from the lower end of the tank case cover 202 to an upper end of the sound absorption pad 240. Thus, the sound absorption pad 240 may not interfere with the tank case 149, and the tank case cover 202 may be compact.

The sound absorption member 241 may cover the hook 206 disposed on the outer cover portion 202a. The sound absorption member 241 may compress the hook 206 and a periphery of the hook 206 to minimize leakage of noise through a gap generated by the hook 206.

Figure 14:
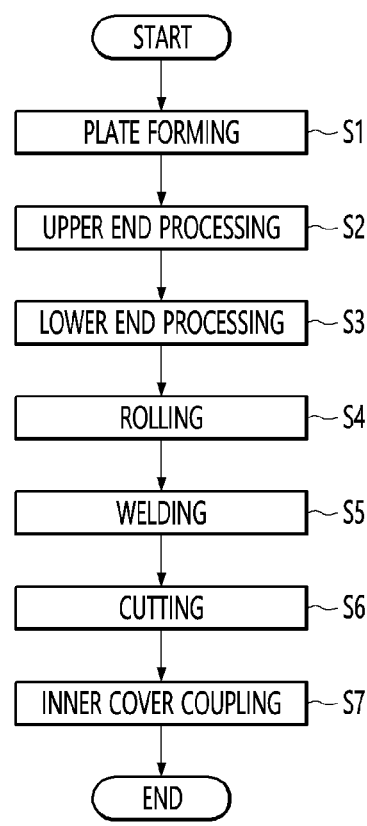
FIG. 14 is a schematic flowchart of a method for manufacturing a tank case cover according to an embodiment.

FIG. 14 is a schematic flowchart of a method for manufacturing a tank case cover according to an embodiment. Hereinafter, a method of manufacturing a tank case cover 202 will be described. Those skilled in the art will readily understand that the fermentation module cover 201 may also be manufactured in a same or similar manner.

The method for manufacturing the tank case cover 202 may include a plate forming process or operation (S1), processing process or operations (S2 and S3), a rolling process or operation (S4), a welding process or operation (S5), a cutting process or operation (S6), and a coupling process or operation (S7).

The plate forming operation (S1) is an operation of manufacturing a metal plate having an appropriate size. When using a pre-made metal plate, the plate forming operation (S1) may be omitted.

The processing operations (S2 and S3) are operations of curling or bending upper and lower ends of the metal plate to one side. The processing operations (S2 and S3) may include an upper end processing operation (S2) for curling an upper end of the metal plate, and a lower end processing operation (S3) for bending a lower end of the metal plate. The order of the upper end processing operation (S2) and the lower end processing operation (S3) is irrelevant. An upper processed portion 207a and a lower processed portion 207b of the outer cover 202a may be formed by the processing operations (S2 and S3).

The rolling operation (S4) is an operation of rolling the metal plate so that both right and left or lateral ends of the metal plate contact each other. The metal plate may be rolled in a direction in which the upper processed portion 207a and the lower processed portion 207b are disposed at the inside.

The welding operation (S5) is an operation of bonding both right and left or lateral ends of the metal plate contacting each other by welding, for example. The outer cover 202a may have a hollow cylindrical shape by the rolling operation (S4) and the welding operation (S5).

The cutting operation (S6) is an operation of cutting and removing a portion of a circumferential surface to which the lower end of the outer cover 202a is connected. An opening of the outer cover 202a may be formed by the cutting operation (S6). The opening of the outer cover 202a may be defined by both ends of the outer cover portion 204a and a portion the lower ends of the outer fixing portion 203a, at which both the ends of the outer cover portion 204a are connected.

The cutting operation (S6) may be performed by 3D laser cutting, for example. The outer cover 202a may be cut so that a plurality of protrusions are formed at both ends of the outer cover portion 204a. The protrusions may protrude from both ends of the outer cover portion 204a in a circumferential direction of the outer cover portion 204a. Each of the protrusions may be bent in the bonding operation (S7) to form hook 206. The protrusion may be a configuration in which the hook 206 is unfolded.

The bonding operation (S7) is an operation of bonding the inner cover 202b to the inner surface of the outer cover 202a. The inner cover 202b may be injection molded separately to correspond to a shape of the outer cover 202a.

The inner cover 202b may be fitted between the upper processed portion 207a and the lower processed portion 207b of the outer cover 202a. In this state, the protrusion of the outer cover portion 204a, which is formed in the cutting operation (S6) may be bent to be hooked with the hook catching portion 208 formed on both ends of the inner cover portion 204b to form the hook 206. The inner cover 202b and the outer cover 202a may be firmly coupled.

Figure 15:
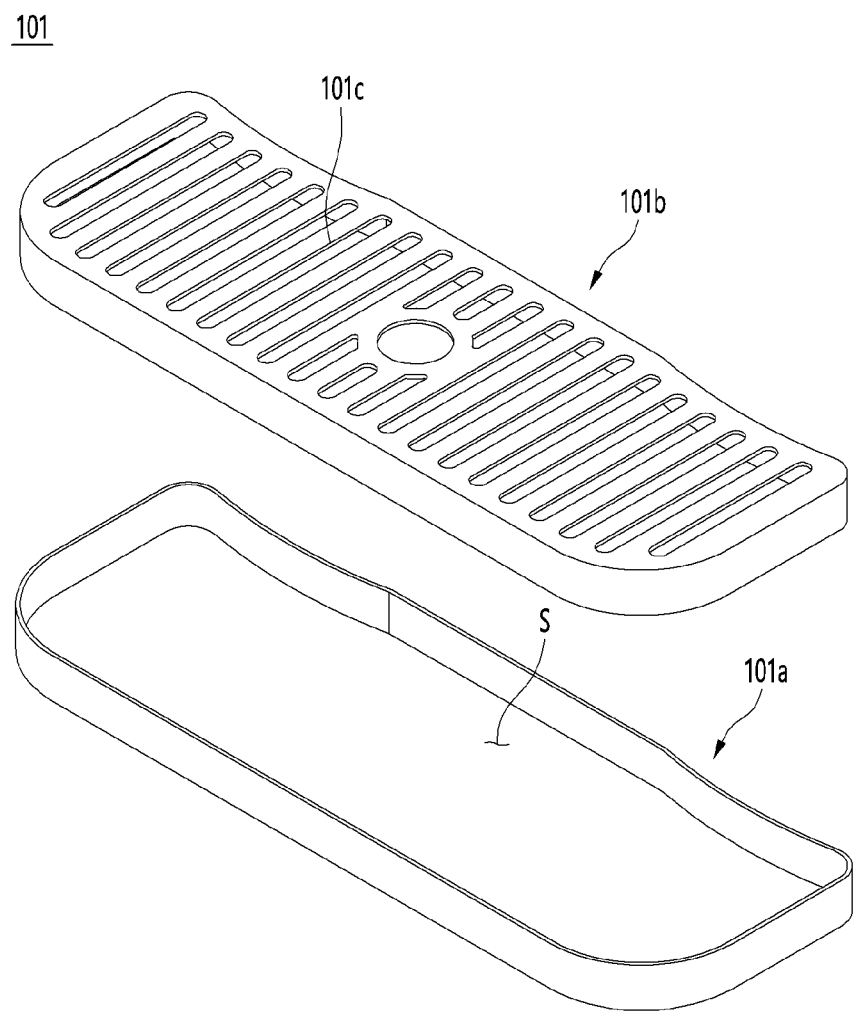
FIG. 15 is an exploded perspective view of a residual fluid tray according to an embodiment.
Figure 16:
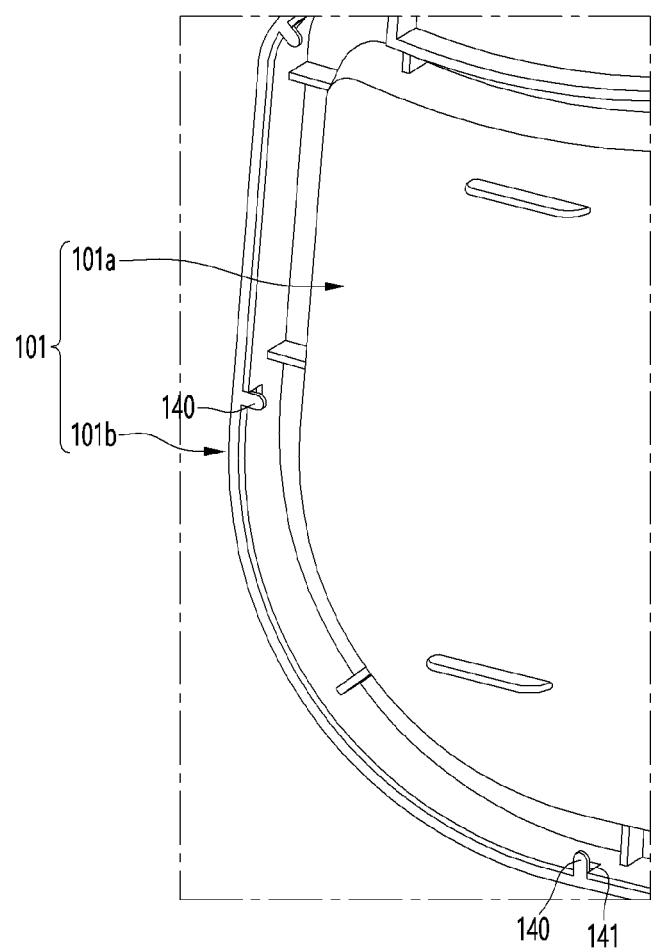
FIG. 16 is a bottom view of the residual fluid tray according to an embodiment.

FIG. 15 is an exploded perspective view of a residual fluid tray according to an embodiment. FIG. 16 is a bottom view of the residual fluid tray according to an embodiment.

The residual fluid tray 101 may receive and store beverage dropping from the dispenser 62 (see FIG. 2). The residual fluid tray 101 may be coupled to the base 100 and disposed under the dispenser 62.

The residual fluid tray 101 may include a tray body 101a, in which a space S in which the dropping beverage may be accommodated may be defined, and a tray cover 101b that covers the space S at the upper side. The tray body 101a may have a box shape with an open top surface. The tray cover 101b may cover the open top surface of the tray body 101a and a circumferential surface of the tray body 101a. A plurality of holes 101c that penetrate vertically may be defined in the tray cover 101b.

Among the beverage dropping from the dispenser 62, the beverage dropping around the beverage container (not shown) may drop into the tray cover 101b and then be temporarily stored in the residual fluid tray 101 through the holes 101c of the tray cover 101b. Therefore, a periphery of the beverage maker may be maintained in a clean state.

The tray cover 101b may be made of a metal material, and the tray body 101a may be made of a non-metal material. As the tray cover 101b, which defines an outer appearance of the residual fluid tray 101, is made of the metal material, the outer appearance of the beverage maker may be designed in a luxurious manner. As the tray body 101a is made of the non-metallic material, a load of the residual fluid tray 101 may be prevented from being excessively heavy.

A plurality of hooks 140 that couples the tray body 101a may be disposed on the tray cover 101b. The hooks 140 may protrude inward from a lower end of the tray cover 101b. The plurality of hooks 140 may be spaced apart from each other along the lower end of the tray cover 101b. A hook catching portion 141 on which each of the hooks 140 is hooked may be disposed on the lower end of the tray body 101a. The tray cover 101b and the tray body 101a may be firmly coupled to each other.

According to embodiments, the sound absorption pad may be attached to the tank case and the cover surrounding the machine room to minimize transmission of noise generated from a noise source disposed in the machine room to outside of the beverage maker. As the sound absorption member is compressed between the case and the tank case, transmission of noise of the machine room to the outside through a gap between the cover and the tank case may be minimized. Further, as the sound absorption pad is disposed in the machine room or disposed to face the machine room, the noise may be reduced with maximum efficiency although the sound absorption pad has a limited size.

In addition, the sound absorption pad may vertically overlap the gap between the inner surface of the cover and the outer surface of the tank case. Therefore, the cover may be compact.

A height from the lower end of the cover to the lower end of the sound absorption member may be higher than a height from the lower end of the cover to the upper end of the sound absorption pad. Therefore, the cover may be more compact.

The cover may include the outer cover made of a metallic material and the inner cover coupled to the inside of the outer cover and made of a nonmetallic material. As a result, when compared to all covers having a same thickness, a noise reduction effect of the cover may be improved, an outer appearance of the cover may be gentrified or improved, and the cover may be prevented from being too heavy.

In addition, the cover may be fixed to the tank case by the fixing portion in a horizontal direction, and the tank case and the machine room may be covered by the cover portion.

The sound absorption member may extend vertically lengthwise along both ends of the cover portion. Therefore, a noise reduction effect may be maximally obtained using the sound absorption member having a limited volume.

The plurality of hooks configured to couple the inner cover may be disposed on the outer cover, and the hook catching portion that is stepped with respect to the end of the inner cover may be disposed on the inner cover. Therefore, the outer cover and the inner cover may be firmly coupled to each other.

The sound absorption member may cover the hook. As a result, noise may be prevented from leaking through a gap around the hook.

The upper processed portion and the lower processed portion may be disposed on upper and lower ends of the outer cover. Therefore, a risk of injury to a user due to a sharp shape of the outer cover may be removed.

The inner cover may be disposed vertically between the upper processed portion and the lower processed portion. Therefore, the inner cover may be restricted and coupled to the outer cover in the vertical direction.

Embodiments disclosed herein provide a beverage maker having reduced operation noise. Embodiments also provide a method for manufacturing a cover that is capable of effectively removing or reducing operation noise of a beverage maker.

In a beverage maker according to embodiments disclosed herein, a sound absorption pad may be attached to the tank case and the cover surrounding the machine room to minimize transmission of noise generated from a noise source disposed in the machine room to outside of the beverage maker. Further, as the sound absorption member is compressed between the case and the tank case, transmission of the noise of the machine room to the outside through a gap between the cover and the tank case may be minimized. Furthermore, as the sound absorption pad is disposed in the machine room or disposed to face the machine room, noise may be reduced with maximum efficiency although the sound absorption pad has a limited size.

A beverage maker according to embodiments disclosed herein may include a base; a tank case which is spaced upward from the base and in which a tank may be accommodated; a machine room defined between the base and the tank case; a cover configured to cover the tank case and the machine room at one side; a sound absorption pad attached to an inner surface of the cover, the sound absorption pad being disposed within the machine room or facing the machine room; and at least one sound absorption member compressed between the inner surface of the cover and an outer surface of the tank case. The beverage maker may further include a fermentation module disposed above the base. The machine room may be provided with at least one of a pump configured to pump a fluid, such as water within the tank accommodated in the tank case to the fermentation module; an air injection pump configured to inject air into the fermentation module; or a compressor configured to allow a refrigerant that adjusts a temperature of the fermentation module to circulate.

The sound absorption pad may vertically overlap a gap between the inner surface of the cover and the outer surface of the tank case. A height from a lower end of the cover to a lower end of the sound absorption member may be higher than a height from the lower end of the cover to an upper end of the sound absorption pad.

The cover may include an outer cover made of a metallic material, and an inner cover coupled to the inside of the outer cover and made of a nonmetallic material. The outer cover may include a fixing portion having a ring shape to surround an upper circumference of the tank case, and a cover portion that extends lengthwise from a portion of a lower end of the fixing portion.

The inner cover may include an inner fixing portion having a ring shape to surround the upper circumference of the tank case, the inner fixing portion being disposed inside of the fixing portion, and an inner cover portion that extends lengthwise downward from a portion of a lower end of the inner fixing portion, the inner cover portion being disposed inside of the cover portion. The sound absorption member may extend lengthwise vertically along both ends of the cover portion.

A plurality of hooks configured to couple the inner cover may be disposed on both ends of the cover portion. A hook catching portion with which the hook may be hooked and which may be stepped with respect to the end of the inner cover may be disposed on each of both ends of the inner cover. The sound absorption member may cover the hook.

An upper processed portion in which an upper end of the outer cover is curled or bent inward may be disposed on the upper end of the outer cover, and a lower processed portion in which a lower end of the outer cover is curled or bent may be disposed on the lower end of the outer cover. The inner cover may be disposed vertically between the upper processed portion and the lower processed portion.

A method for manufacturing a cover of a beverage maker according to embodiments disclosed herein may include curling or bending upper and lower ends of a metal plate to one side; rolling the metal plate so that both left and right or lateral ends of the metal plate contact each other; bonding both the left and right ends of the metal plate through welding to form an outer cover; cutting and removing a portion of a circumferential surface to which a lower end of the outer cover may be connected; and coupling an inner cover, which may be injection-molded to correspond to a shape of the outer cover, to an inner surface of the outer cover. At least one of a sound absorption pad or a sound absorption member may be attached to an inner surface of the inner cover. In the cutting of the portion of the circumferential surface, a hook configured to couple the inner cover may be provided on the outer cover.

A beverage maker according to embodiments disclosed herein may include a base; a tank case which is spaced upward from the base and in which a tank may be accommodated; a machine room defined between the base and the tank case; and a cover configured to cover the tank case and the machine room at one side. The cover may include an outer cover made of a metallic material, and an inner cover coupled to the inside of the outer cover and made of a nonmetallic material.

The outer cover may include a fixing portion having a ring shape to surround an upper circumference of the tank case, and a cover portion that extends lengthwise from a portion of a lower end of the fixing portion. The inner cover may include an inner fixing portion having a ring shape to surround the upper circumference of the tank case, the inner fixing portion being disposed inside of the fixing portion, and an inner cover portion that extends lengthwise downward from a portion of a lower end of the inner fixing portion, the inner cover portion being disposed inside of the cover portion.

A plurality of hooks configured to couple the inner cover may be disposed on both ends of the cover portion. A plurality of hooks configured to couple the inner cover may be disposed on both ends of the cover portion, and a hook catching portion with which the hook may be hooked and which may be stepped with respect to the end of the inner cover may be disposed on each of both ends of the inner cover.

The details of one or more embodiments are set forth in the accompanying drawings and the description. Other features will be apparent from the description and drawings, and from the claims.

The disclosed subject matter is to be considered illustrative, and not restrictive, and the appended claims are intended to cover all such modifications, enhancements, and other embodiments, which fall within the true spirit and scope. Thus, embodiments are to be considered illustrative, and not restrictive, and the technical spirit is not limited to the embodiments. Therefore, the scope is defined not by the detailed description but by the appended claims, and all differences within the scope will be construed as being included.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A beverage maker, comprising:
    a base;
    a tank case spaced upward from the base and in which a tank configured to contain a fluid for making a beverage is accommodated;
    a machine room defined between the base and the tank case;
    a cover configured to cover the tank case and the machine room at one side;
    a sound absorption pad attached to an inner surface of the cover, the sound absorption pad being disposed within the machine room or facing the machine room; and
    at least one sound absorption member comprising an elastic member compressed between the inner surface of the cover and an outer surface of the tank case, wherein the cover comprises:
        an outer cover made of a metallic material; and
        an inner cover coupled to an inside of the outer cover and made of a nonmetallic material, and wherein the outer cover comprises:
            a fixing portion having a ring shape to surround an upper circumference of the tank case; and
            a cover portion that extends lengthwise from a portion of a lower end of the fixing portion.

2. The beverage maker according to claim 1, further comprising a fermentation module disposed above the base, wherein the machine room is provided with at least one of:
    a pump configured to pump the fluid within the tank accommodated in the tank case to the fermentation module;
    an air injection pump configured to inject air into the fermentation module; or
    a compressor configured to compress a refrigerant to adjust a temperature of the fermentation module.

3. The beverage maker according to claim 1, wherein the sound absorption pad vertically overlaps a gap between the inner surface of the cover and the outer surface of the tank case.

4. The beverage maker according to claim 1, wherein a height from a lower end of the cover to a lower end of the at least one sound absorption member is higher than a height from the lower end of the cover to an upper end of the sound absorption pad.

5. The beverage maker according to claim 1, wherein the inner cover comprises:
    an inner fixing portion having a ring shape to surround the upper circumference of the tank case, the inner fixing portion being disposed inside of the fixing portion; and
    an inner cover portion that extends lengthwise downward from a portion of a lower end of the inner fixing portion, the inner cover portion being disposed inside of the cover portion.

6. The beverage maker according to claim 1, wherein the at least one sound absorption member extends lengthwise vertically along lateral ends of the cover portion.

7. The beverage maker according to claim 1, wherein a plurality of hooks configured to couple the inner cover are disposed on lateral ends of the cover portion.

8. The beverage maker according to claim 7, wherein a hook catching portion with which the plurality of hooks is hooked and which is stepped with respect to lateral ends of the inner cover is disposed on each of the lateral ends of the inner cover.

9. The beverage maker according to claim 7, wherein the at least one sound absorption member covers the plurality of hooks.

10. The beverage maker according to claim 1, wherein an upper processed portion at which an upper end of the outer cover is curled or bent inward is disposed on the upper end of the outer cover, wherein a lower processed portion at which a lower end of the outer cover is curled or bent is disposed on the lower end of the outer cover.

11. The beverage maker according to claim 10, wherein the inner cover is disposed vertically between the upper processed portion and the lower processed portion.

* * * * *